(12) United States Patent
Zhang et al.

(10) Patent No.: US 12,213,145 B2
(45) Date of Patent: Jan. 28, 2025

(54) DATA RECEIVING AND SENDING METHOD AND TERMINAL APPARATUS

(71) Applicant: HUAWEI TECHNOLOGIES CO., LTD., Guangdong (CN)

(72) Inventors: Lili Zhang, Beijing (CN); Xingwei Zhang, Lund (SE); Chao Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 428 days.

(21) Appl. No.: 17/489,637

(22) Filed: Sep. 29, 2021

(65) Prior Publication Data

US 2022/0022241 A1  Jan. 20, 2022

Related U.S. Application Data

(63) Continuation of application No. PCT/CN2020/080775, filed on Mar. 24, 2020.

(30) Foreign Application Priority Data

Mar. 29, 2019  (CN) .......................... 201910252159.5

(51) Int. Cl.
*H04W 72/23* (2023.01)
*H04L 1/00* (2006.01)
(Continued)

(52) U.S. Cl.
CPC .......... *H04W 72/23* (2023.01); *H04L 1/0003* (2013.01); *H04L 5/0053* (2013.01); *H04W 72/1273* (2013.01); *H04W 4/40* (2018.02)

(58) Field of Classification Search
CPC ... H04W 72/23; H04W 72/1273; H04W 4/40; H04L 1/0003; H04L 5/0053
See application file for complete search history.

(56) References Cited

U.S. PATENT DOCUMENTS

| 2016/0066337 A1 | 3/2016 | Sartori et al. |
| 2017/0181155 A1* | 6/2017 | Chen ..................... H04W 72/23 |
| 2019/0082457 A1 | 3/2019 | Zhou et al. |

FOREIGN PATENT DOCUMENTS

| CN | 108282291 A | 7/2018 |
| CN | 108632960 A | 10/2018 |

(Continued)

OTHER PUBLICATIONS

Huawei, Email discussion [86b-23] on multi-steps DL control channel design, 3GPP TSG RAN WG1 Meeting #87, R1-1611656, Reno, USA, Nov. 14-18, 2016, 13 Pages.

(Continued)

*Primary Examiner* — Natasha W Cosme

(57) ABSTRACT

This application discloses a data receiving method, which may be applied to Internet of Vehicles, for example, V2X, LTE-V, and V2V. A first terminal apparatus may receive first control information from a second terminal apparatus, then receive second control information from the second terminal apparatus based on the first control information, and further receive, based on the first control information and the second control information, data sent by the second terminal apparatus. Therefore, the second control information and the data can be received after blind detection is performed on the first control information for a relatively small quantity of times, thereby improving efficiency of receiving the second control information and the data.

21 Claims, 9 Drawing Sheets

(51) Int. Cl.
*H04L 5/00* (2006.01)
*H04W 4/40* (2018.01)
*H04W 72/1273* (2023.01)

(56) References Cited

FOREIGN PATENT DOCUMENTS

| CN | 109309957 A | 2/2019 |
|---|---|---|
| CN | 110719635 A | 1/2020 |
| KR | 20170020458 A | 2/2017 |
| KR | 20190027314 A | 3/2019 |
| WO | 2012150822 A2 | 11/2012 |
| WO | 2016163972 A1 | 10/2016 |
| WO | 2017135998 A1 | 8/2017 |

OTHER PUBLICATIONS

3GPP TS 38.211 V15.5.0 (Mar. 2019), 3rd Generation Partnership Project;Technical Specification Group Radio Access Network;NR;Physical channels and modulation(Release 15), total 96 pages.

3GPP TS 38.212 V15.5.0 (Mar. 2019), 3rd Generation Partnership Project;Technical Specification Group Radio Access Network;NR;Multiplexing and channel coding(Release 15), total 101 pages.

3GPP TS 38.213 V15.5.0 (Mar. 2019), 3rd Generation Partnership Project;Technical Specification Group Radio Access Network;NR;Physical layer procedures for control(Release 15), total 104 pages.

3GPP TS 38.214 V15.5.0 (Mar. 2019), 3rd Generation Partnership Project;Technical Specification Group Radio Access Network;NR;Physical layer procedures for data(Release 15), total 103 pages.

3GPP TS 38.321 V15.4.0 (Dec. 2018), 3rd Generation Partnership Project;Technical Specification Group Radio Access Network;NR;Medium Access Control (MAC) protocol specification(Release 15), total 77 pages.

3GPP TS 38.331 V15.4.0 (Dec. 2018), 3rd Generation Partnership Project;Technical Specification Group Radio Access Network;NR-;Radio Resource Control (RRC) protocol specification(Release 15), total 474 pages.

R1-1813638, Ericsson, Physical layer structure for SL NR V2X, 3GPP TSG-RAN WG1 Meeting #95, Spokane, WA, US, Nov. 12-16, 2018, total 17 pages.

R1-1900326, CATT, Discussion On Uu-based sidelink resource allocation/configuration in NR V2X, 3GPP TSG RAN WG1 Ad-Hoc Meeting 1901, Taipei, Jan. 21-25, 2019, total 5 pages.

R1-1901536, Huawei et al, Sidelink physical layer structure for NR V2X, 3GPP TSG RAN WG1 Meeting #96, Athens, Greece, Feb. 25-Mar. 1, 2019, total 12 pages.

R1-1901809, MediaTek Inc. et al, On sidelink physical layer structure, 3GPP TSG RAN WG1 #96, Athens, Greece, Feb. 25-Mar. 1, 2019, total 11 pages.

R1-1903163, Ericsson, Remaining details on physical structure for NR SL, 3GPP TSG-RAN WG1 Meeting #96, Athens, Greece Feb. 25-Mar. 1, 2019, total 14 pages.

R1-1813648(Revision of R1-181607), Ericsson, On 2-stage PSCCH design, 3GPP TSG-RAN WG1 Meeting #95, Spokane, WA, US, Nov. 12-16, 2018, 5 pages.

R1-1900196, MediaTek Inc., On sidelink physical layer structure, 3GPP TSG RAN WG1 Ad-Hoc Meeting 1901, Taipei, Taiwan, Jan. 21-25, 2019, 10 pages.

R1-1903173, Ericsson, On SCI and SFCI formats, 3GPP TSG-RAN WG1 Meeting #96, Athens, Greece Feb. 25-Mar. 1, 2019, 3 pages.

* cited by examiner

DATA RECEIVING AND SENDING METHOD AND TERMINAL APPARATUS

CROSS-REFERENCE TO RELATED APPLICATIONS

This application is a continuation of International Application No. PCT/CN2020/080775, filed on Mar. 24, 2020, which claims priority to Chinese Patent Application No. 201910252159.5, filed on Mar. 29, 2019. The disclosures of the aforementioned applications are hereby incorporated by reference in their entireties.

TECHNICAL FIELD

This application relates to the field of communication technologies, and specifically, to a data receiving and sending method and a terminal apparatus.

BACKGROUND

A terminal may communicate with a network device, or may directly communicate with another terminal. Generally, a communication link between the network device and the terminal is referred to as a main link or a cellular communication link, and a communication link between terminals is referred to as a sidelink (sidelink, SL) or an auxiliary communication link.

When data is transmitted on the main link, the network device may schedule the terminal to receive or send the data. When the data is transmitted on the sidelink, the terminal may schedule another terminal to receive the data or send the data. In a scheduling process of the main link, the network device sends downlink control information (downlink control information, DCI). In a scheduling process of the sidelink, the terminal that performs scheduling sends SL control information (sidelink control information, SCI). The DCI or the SCI is used to indicate a scheduled terminal how to receive or send data.

On either the main link or the sidelink, there are many terminals. Even if some terminals are unscheduled terminals, the terminals still detect the DCI or the SCI. These unscheduled terminals still perform blind detection for a plurality of times, undoubtedly causing a waste of resources. In addition, scheduled terminals can receive the DCI or the SCI only after performing blind detection for a large quantity of times. Consequently, detection efficiency is low.

SUMMARY

Embodiments of this disclosure include a data receiving and sending method. After first control information is received, second control information may be received based on the first control information, so that a quantity of blind detection times is reduced, thereby improving efficiency of receiving the second control information and data. The embodiments of this disclosure further provide a corresponding terminal apparatus.

A first aspect of this disclosure provides a data receiving method, and the method may include:

A first terminal apparatus receives first control information from a second terminal apparatus, where the first control information is used to indicate a resource for to-be-sent data of the second terminal apparatus and/or a priority of the to-be-sent data, the first control information includes first identification information, and the first identification information is used to indicate at least one terminal apparatus that needs to receive the to-be-sent data.

The first terminal apparatus determines, based on the first identification information, that the first terminal apparatus belongs to the at least one terminal apparatus.

The first terminal apparatus receives second control information from the second terminal apparatus, where the second control information includes at least one of transport format information of the to-be-sent data, indication information about channel state information, and indication information of feedback information for the to-be-sent data.

The first terminal apparatus receives the to-be-sent data based on the first control information and the second control information.

The first terminal apparatus may be a terminal, or may be a chip or another combined component. The second terminal apparatus may be a terminal, or may be a network device, a chip, or another combined component.

It can be learned from the first aspect that, after receiving the first control information, the first terminal apparatus may receive the second control information based on the first control information, so that a quantity of blind detection times is reduced, thereby improving efficiency of receiving the second control information and the data.

In an optional design, a format of the first control information is different from a format of the second control information. In some cases, a format of the first control information may alternatively be the same as a format of the second control information.

It can be learned from the possible design that the formats of the two types of control information are different, so that it can be effectively avoided that the second control information is incorrectly received when the first control information is received.

In an optional design, the first identification information is one of the following identifiers:
an identifier of each terminal apparatus in the at least one terminal apparatus;
an identifier of a pair formed by each terminal apparatus in the at least one terminal apparatus and the second terminal apparatus;
an identifier of a group to which the at least one terminal apparatus belongs;
a radio network temporary identifier RNTI of each terminal apparatus in the at least one terminal apparatus;
an RNTI of a pair formed by each terminal apparatus in the at least one terminal apparatus and the second terminal apparatus; or
an RNTI of a group to which the at least one terminal apparatus belongs.

It can be learned from the possible design that there may be a plurality of types of first identification information, so that diversity of the first identification information is ensured.

In an optional design, the first control information may further include resource information of the second control information, where the resource information of the second control information indicates a resource for transmitting the second control information.

That the first terminal apparatus receives the second control information from the second terminal apparatus may include:

The first terminal apparatus receives the second control information from the resource for transmitting the second control information.

Alternatively, the resource information of the second control information may be indicated by first indication information, where the first indication information may indicate the resource for transmitting the second control information.

It can be learned from the possible design that the second control information may be received from the resource for transmitting the second control information, so that efficiency of receiving the second control information is improved.

In an optional design, the first control information further includes resource information of the second control information, and the resource information of the second control information indicates a location relationship between a resource for transmitting the second control information and a resource for transmitting the first control information; and the method may further include:

The first terminal apparatus determines, based on the location relationship and the resource for transmitting the first control information, the resource for transmitting the second control information.

That the first terminal apparatus receives the second control information from the second terminal apparatus may include:

The first terminal apparatus receives the second control information from the resource for transmitting the second control information.

The resource information of the second control information may alternatively be represented by first indication information, where the first indication information may indicate the location relationship between the resource for transmitting the second control information and the resource for transmitting the first control information.

It can be learned from the possible design that the resource for transmitting the second control information may be determined based on the foregoing location relationship, and then the second control information is received, thereby improving efficiency of receiving the second control information.

In an optional design, that the first terminal apparatus determines, based on the location relationship and the resource for transmitting the first control information, the resource for transmitting the second control information may include:

When the first control information is located in a first control channel element CCE, the first terminal apparatus determines, based on the first CCE and the location relationship, that the second control information is located in a second CCE;

when the first control information is located in a first time domain unit, the first terminal apparatus determines, based on the first time domain unit and the location relationship, that the second control information is located in a second time domain unit; or when the first control information is located in a first control resource set CORSET, the first terminal apparatus determines, based on the first CORSET and the location relationship, that the second control information is located in a second CORSET.

It can be learned from the possible design that there may be a plurality of forms of the location relationship between the resource for transmitting the second control information and the resource for transmitting the first control information.

In an optional design, the resource for transmitting the second control information includes at least one of the following:

a time domain resource for transmitting the second control information;

a frequency domain resource for transmitting the second control information; or a spatial domain resource for transmitting the second control information.

In an optional design, the location relationship between the resource for transmitting the second control information and the resource for transmitting the first control information may include:

an offset of a time domain resource for transmitting the second control information relative to a time domain resource for transmitting the first control information;

an offset of a frequency domain resource for transmitting the second control information relative to a frequency domain resource for transmitting the first control information; or an offset of a spatial domain resource for transmitting the second control information relative to a spatial domain resource for transmitting the first control information.

In an optional design, the first control information may further include at least one of the following information: a modulation and coding scheme MCS of the to-be-sent data, a new data indicator NDI, a redundancy version, a repetition number, or an aggregation level of the resource for transmitting the second control information.

In an optional design, the transport format information of the to-be-sent data may include at least one of the following information: a modulation and coding scheme MCS of the to-be-sent data, a new data indicator NDI, a redundancy version, or a repetition number.

In an optional design, the indication information about the channel state information is used to indicate at least one of the following information:

whether the at least one terminal apparatus needs to feed back the channel state information; or a type of the channel state information that needs to be fed back by the at least one terminal apparatus; and/or the indication information of the feedback information for the to-be-sent data is used to indicate at least one of the following information:

whether the at least one terminal apparatus needs to send the feedback information for the to-be-sent data; or a resource used by the at least one terminal apparatus to send the feedback information for the to-be-sent data.

In an optional design, the first control information is located in a first search space, the second control information is located in a second search space, and the first search space is different from the second search space.

A second aspect of this disclosure provides a data sending method, and the method may include:

A second terminal apparatus sends first control information, where the first control information is used to indicate a resource for to-be-sent data of the second terminal apparatus and/or a priority of the to-be-sent data, the first control information includes first identification information, and the first identification information is used to indicate at least one terminal apparatus that needs to receive the to-be-sent data.

The second terminal apparatus sends second control information, where the second control information includes at least one of transport format information of the to-be-sent data, indication information about channel state information, and indication information of feedback information for the to-be-sent data.

The second terminal apparatus sends the to-be-sent data.

The second terminal apparatus may be a terminal, or may be a network device, a chip, or another combined component. Each terminal apparatus in the at least one terminal apparatus may also be referred to as a first terminal apparatus, and the first terminal apparatus may be a terminal, a chip, or another combined component.

It can be learned from the foregoing second aspect that the second terminal apparatus separately sends the first control information and the second control information that are for the to-be-sent data. In this way, after receiving the first control information, the first terminal apparatus may receive the second control information based on the first control information, so that a quantity of blind detection times is reduced, thereby improving efficiency of receiving the second control information and the data.

In an optional design, a format of the first control information is different from a format of the second control information. In some cases, the format of the first control information may alternatively be the same as the format of the second control information.

It can be learned from the possible design that the formats of the two types of control information are different, so that it can be effectively avoided that the second control information is incorrectly received when the first control information is received.

In an optional design, the first identification information is one of the following identifiers:
  an identifier of each terminal apparatus in the at least one terminal apparatus;
  an identifier of a pair formed by each terminal apparatus in the at least one terminal apparatus and the second terminal apparatus;
  an identifier of a group to which the at least one terminal apparatus belongs;
  a radio network temporary identifier RNTI of each terminal apparatus in the at least one terminal apparatus;
  an RNTI of a pair formed by each terminal apparatus in the at least one terminal apparatus and the second terminal apparatus; or
  an RNTI of a group to which the at least one terminal apparatus belongs.

It can be learned from the possible design that there may be a plurality of types of first identification information, so that diversity of the first identification information is ensured.

In an optional design, the first control information may further include resource information of the second control information, where the resource information of the second control information indicates a resource for transmitting the second control information.

The resource for transmitting the second control information is used by the first terminal apparatus to receive the second control information.

Alternatively, the resource information of the second control information may be indicated by first indication information, where the first indication information may indicate the resource for transmitting the second control information.

It can be learned from the possible design that the second control information may be received from the resource for transmitting the second control information, so that efficiency of receiving the second control information is improved.

In an optional design, the first control information further includes resource information of the second control information, and the resource information of the second control information indicates a location relationship between a resource for transmitting the second control information and a resource for transmitting the first control information.

The location relationship is used by the first terminal apparatus to: determine the resource for transmitting the second control information, and then receive the second control information from the resource for transmitting the second control information.

The resource information of the second control information may alternatively be represented by first indication information, where the first indication information may indicate the location relationship between the resource for transmitting the second control information and the resource for transmitting the first control information.

It can be learned from the possible design that the resource for transmitting the second control information may be determined based on the foregoing location relationship, and then the second control information is received, thereby improving efficiency of receiving the second control information.

In an optional design, the resource for transmitting the second control information includes at least one of the following:
  a time domain resource for transmitting the second control information;
  a frequency domain resource for transmitting the second control information; or
  a spatial domain resource for transmitting the second control information.

In an optional design, the location relationship between the resource for transmitting the second control information and the resource for transmitting the first control information may include:
  an offset of a time domain resource for transmitting the second control information relative to a time domain resource for transmitting the first control information;
  an offset of a frequency domain resource for transmitting the second control information relative to a frequency domain resource for transmitting the first control information; or
  an offset of a spatial domain resource for transmitting the second control information relative to a spatial domain resource for transmitting the first control information.

In an optional design, the first control information may further include at least one of the following information: a modulation and coding scheme MCS of the to-be-sent data, a new data indicator NDI, a redundancy version, a repetition number, or an aggregation level of the resource for transmitting the second control information.

In an optional design, the transport format information of the to-be-sent data may include at least one of the following information: a modulation and coding scheme MCS of the to-be-sent data, a new data indicator NDI, a redundancy version, or a repetition number.

In an optional design, the indication information about the channel state information is used to indicate at least one of the following information:
  whether the at least one terminal apparatus needs to feed back the channel state information; or
  a type of the channel state information that needs to be fed back by the at least one terminal apparatus; and/or
  the indication information of the feedback information for the to-be-sent data is used to indicate at least one of the following information:
  whether the at least one terminal apparatus needs to send the feedback information for the to-be-sent data; or
  a resource used by the at least one terminal apparatus to send the feedback information for the to-be-sent data.

In an optional design, the first control information is located in a first search space, the second control information is located in a second search space, and the first search space is different from the second search space.

A third aspect of this disclosure provides a data receiving method, and the method may include:

A first terminal apparatus receives first control information from a second terminal apparatus, where the first control information is used to indicate a resource for to-be-sent data of the second terminal apparatus and/or a priority of the to-be-sent data, the first control information includes first indication information, and the first indication information is used to indicate at least one of transport format information of the to-be-sent data and related information for receiving the second control information.

The first terminal apparatus receives the to-be-sent data based on the first control information; or
the first terminal apparatus receives the second control information from the second terminal apparatus, and receives the to-be-sent data based on the first control information and the second control information, where the second control information includes at least one of indication information about channel state information and indication information of feedback information for the to-be-sent data.

The second control information may further include the transport format information.

The first terminal apparatus may be a terminal, or may be a chip or another combined component. The second terminal apparatus may be a terminal, or may be a network device, a chip, or another combined component.

It can be learned from the third aspect that, after receiving the first control information, the first terminal apparatus may receive the second control information based on the first control information, so that a quantity of blind detection times is reduced, thereby improving efficiency of receiving the second control information and the data.

In an optional design, the first indication information includes one or a combination of the following:
  indication information about whether to receive the second control information;
  information about an aggregation level of a resource for transmitting the second control information;
  first identification information;
  resource information of the second control information, where the resource information of the second control information indicates a resource for transmitting the second control information; or
  a modulation and coding scheme MCS of the to-be-sent data, a new data indicator NDI, a redundancy version, or a repetition number.

In an optional design, the transport format information of the to-be-sent data may include at least one of the following information:
  a modulation and coding scheme MCS of the to-be-sent data, a new data indicator NDI, a redundancy version, or a repetition number.

In an optional design, the related information for receiving the second control information may include at least one of the following information: indication information about whether to receive the second control information;
  information about an aggregation level of a resource for transmitting the second control information;
  first identification information; or
  resource information of the second control information, where the resource information of the second control information indicates a resource for transmitting the second control information.

In an optional design, before the first terminal apparatus receives the second control information from the second terminal apparatus, the method may further include: The first terminal apparatus determines, based on the first indication information, how to detect the second control information.

In an optional design, that the first terminal apparatus determines, based on the first indication information, how to detect the second control information may include:
  When the first indication information includes only the indication information about whether to receive the second control information, the first terminal apparatus blindly detects the second control information;
  when the first indication information includes only the first identification information, the first terminal apparatus determines, based on the first identification information, whether to detect the second control information; or
  when the first indication information includes information about the resource for transmitting the second control information, the first terminal apparatus detects the second control information based on the information about the resource for transmitting the second control information.

In an optional design, a format of the first control information is different from a format of the second control information.

In an optional design, a format of the first control information may alternatively be the same as a format of the second control information.

It can be learned from the possible design that the formats of the two types of control information are different, so that it can be effectively avoided that the second control information is incorrectly received when the first control information is received. Formats of the two types of control information are different, and it can also be ensured that the two types of control information separately include respective corresponding meanings. The first control information is used for resource detection/resource detection, and the second control information is used for transmission scheduling.

In an optional design, the first identification information is one of the following identifiers:
  an identifier of each terminal apparatus in the at least one terminal apparatus;
  an identifier of a pair formed by each terminal apparatus in the at least one terminal apparatus and the second terminal apparatus;
  an identifier of a group to which the at least one terminal apparatus belongs;
  a radio network temporary identifier RNTI of each terminal apparatus in the at least one terminal apparatus;
  an RNTI of a pair formed by each terminal apparatus in the at least one terminal apparatus and the second terminal apparatus; or
  an RNTI of a group to which the at least one terminal apparatus belongs.

It can be learned from the possible design that there may be a plurality of types of first identification information, so that diversity of the first identification information is ensured.

That the first terminal apparatus receives the second control information from the second terminal apparatus may include:
  The first terminal apparatus receives the second control information from the resource for transmitting the second control information.

It can be learned from the possible design that the second control information may be received from the resource for transmitting the second control information, so that efficiency of receiving the second control information is improved.

In an optional design, when resource information of the second control information indicates a location relationship between the resource for transmitting the second control information and a resource for transmitting the first control information, the method may further include:

The first terminal apparatus determines, based on the location relationship and the resource for transmitting the first control information, the resource for transmitting the second control information.

That the first terminal apparatus receives the second control information from the second terminal apparatus may include:

The first terminal apparatus receives the second control information from the resource for transmitting the second control information.

It can be learned from the possible design that the resource for transmitting the second control information may be determined based on the foregoing location relationship, and then the second control information is received, thereby improving efficiency of receiving the second control information.

In an optional design, that the first terminal apparatus determines, based on the location relationship and the resource for transmitting the first control information, the resource for transmitting the second control information may include:

When the first control information is located in a first control channel element CCE, the first terminal apparatus determines, based on the first CCE and the location relationship, that the second control information is located in a second CCE;

when the first control information is located in a first time domain unit, the first terminal apparatus determines, based on the first time domain unit and the location relationship, that the second control information is located in a second time domain unit; or when the first control information is located in a first control resource set CORSET, the first terminal apparatus determines, based on the first CORSET and the location relationship, that the second control information is located in a second CORSET.

It can be learned from the possible design that there may be a plurality of forms of the location relationship between the resource for transmitting the second control information and the resource for transmitting the first control information.

In an optional design, the resource for transmitting the second control information includes at least one of the following:

a time domain resource for transmitting the second control information;

a frequency domain resource for transmitting the second control information; or a spatial domain resource for transmitting the second control information.

In an optional design, the location relationship between the resource for transmitting the second control information and the resource for transmitting the first control information may include:

an offset of a time domain resource for transmitting the second control information relative to a time domain resource for transmitting the first control information;

an offset of a frequency domain resource for transmitting the second control information relative to a frequency domain resource for transmitting the first control information; or an offset of a spatial domain resource for transmitting the second control information relative to a spatial domain resource for transmitting the first control information.

In an optional design, the transport format information of the to-be-sent data may include at least one of the following information: a modulation and coding scheme MCS of the to-be-sent data, a new data indicator NDI, a redundancy version, or a repetition number.

In an optional design, the indication information about the channel state information is used to indicate at least one of the following information:

whether the at least one terminal apparatus needs to feed back the channel state information; or a type of the channel state information that needs to be fed back by the at least one terminal apparatus; and/or the indication information of the feedback information for the to-be-sent data is used to indicate at least one of the following information:

whether the at least one terminal apparatus needs to send the feedback information for the to-be-sent data; or a resource used by the at least one terminal apparatus to send the feedback information for the to-be-sent data.

In an optional design, the first control information is located in a first search space, the second control information is located in a second search space, and the first search space is different from the second search space.

A fourth aspect of this disclosure provides a data sending method, and the method may include:

A second terminal apparatus sends first control information, where the first control information is used to indicate a resource for to-be-sent data and/or a priority of the to-be-sent data, the first control information includes first indication information, and the first indication information is used to indicate at least one of transport format information and indication information for receiving second control information.

The second terminal apparatus sends the to-be-sent data; or the second terminal apparatus sends the second control information and the to-be-sent data, where the second control information includes at least one of indication information about channel state information and indication information of feedback information for the to-be-sent data.

The second control information may further include the transport format information.

The second terminal apparatus may be a terminal, or may be a network device, a chip, or another combined component. Each terminal apparatus in the at least one terminal apparatus may also be referred to as a first terminal apparatus, and the first terminal apparatus may be a terminal, a chip, or another combined component.

It can be learned from the foregoing fourth aspect that the second terminal apparatus separately sends the first control information and the second control information that are for the to-be-sent data. In this way, after receiving the first control information, the first terminal apparatus may receive the second control information based on the first control information, so that a quantity of blind detection times is reduced, thereby improving efficiency of receiving the second control information and the data.

In an optional design, the first indication information includes one or a combination of the following:

indication information about whether to receive the second control information;

information about an aggregation level of a resource for transmitting the second control information;

first identification information;

resource information of the second control information, where the resource information of the second control information indicates a resource for transmitting the second control information; or a modulation and coding scheme MCS of the to-be-sent data, a new data indicator NDI, a redundancy version, or a repetition number.

In an optional design, a format of the first control information is different from a format of the second control information. In some cases, a format of the first control information may alternatively be the same as a format of the second control information.

It can be learned from the possible design that the formats of the two types of control information are different, so that it can be effectively avoided that the second control information is incorrectly received when the first control information is received.

In an optional design, the first identification information is one of the following identifiers:

an identifier of each terminal apparatus in the at least one terminal apparatus;

an identifier of a pair formed by each terminal apparatus in the at least one terminal apparatus and the second terminal apparatus;

an identifier of a group to which the at least one terminal apparatus belongs;

a radio network temporary identifier RNTI of each terminal apparatus in the at least one terminal apparatus;

an RNTI of a pair formed by each terminal apparatus in the at least one terminal apparatus and the second terminal apparatus; or an RNTI of a group to which the at least one terminal apparatus belongs.

It can be learned from the possible design that there may be a plurality of types of first identification information, so that diversity of the first identification information is ensured.

In an optional design, the resource information of the second control information indicates the resource for transmitting the second control information.

The resource for transmitting the second control information is used by the first terminal apparatus to receive the second control information.

In an optional design, the resource information of the second control information indicates a location relationship between the resource for transmitting the second control information and a resource for transmitting the first control information.

The location relationship is used by the first terminal apparatus to: determine the resource for transmitting the second control information, and then receive the second control information from the resource for transmitting the second control information.

It can be learned from the possible design that the resource for transmitting the second control information may be determined based on the foregoing location relationship, and then the second control information is received, thereby improving efficiency of receiving the second control information.

In an optional design, the resource for transmitting the second control information includes at least one of the following:

a time domain resource for transmitting the second control information;

a frequency domain resource for transmitting the second control information; or a spatial domain resource for transmitting the second control information.

In an optional design, the location relationship between the resource for transmitting the second control information and the resource for transmitting the first control information may include:

an offset of a time domain resource for transmitting the second control information relative to a time domain resource for transmitting the first control information;

an offset of a frequency domain resource for transmitting the second control information relative to a frequency domain resource for transmitting the first control information; or an offset of a spatial domain resource for transmitting the second control information relative to a spatial domain resource for transmitting the first control information.

In an optional design, the second control information may include at least one of the following information: a modulation and coding scheme MCS of the to-be-sent data, a new data indicator NDI, a redundancy version, or a repetition number.

In an optional design, the indication information about the channel state information is used to indicate at least one of the following information:

whether the at least one terminal apparatus needs to feed back the channel state information; or a type of the channel state information that needs to be fed back by the at least one terminal apparatus; and/or the indication information of the feedback information for the to-be-sent data is used to indicate at least one of the following information:

whether the at least one terminal apparatus needs to send the feedback information for the to-be-sent data; or a resource used by the at least one terminal apparatus to send the feedback information for the to-be-sent data.

In an optional design, the first control information is located in a first search space, the second control information is located in a second search space, and the first search space is different from the second search space.

A fifth aspect of this disclosure provides a terminal apparatus. The terminal apparatus is configured to perform the data receiving method in any one of the first aspect or the possible designs of the first aspect. Specifically, the terminal apparatus may include units or modules configured to perform the data receiving method in any one of the first aspect or the possible designs of the first aspect, for example, a receiving module and a processing module.

A sixth aspect of this disclosure provides a terminal apparatus. The terminal apparatus is configured to perform the data sending method in any one of the second aspect or the possible designs of the second aspect. Specifically, the terminal apparatus may include units or modules configured to perform the data receiving method in any one of the second aspect or the possible designs of the second aspect, for example, a sending module and a processing module.

A seventh aspect of this disclosure provides a terminal apparatus. The terminal apparatus is configured to perform the data receiving method in any one of the third aspect or the possible designs of the third aspect. Specifically, the terminal apparatus may include units or modules configured to perform the data receiving method in any one of the third aspect or the possible designs of the third aspect, for example, a receiving module and a processing module.

An eighth aspect of this disclosure provides a terminal apparatus. The terminal apparatus is configured to perform the data receiving method in any one of the fourth aspect or the possible designs of the fourth aspect. Specifically, the terminal apparatus may include units or modules configured to perform the data sending method in any one of the fourth aspect or the possible designs of the fourth aspect, for example, a sending module and a processing module.

A ninth aspect of this disclosure provides a terminal apparatus, including at least one processor, a memory, a transceiver, and computer-executable instructions that are stored in the memory and that can be run on the processor. When the computer-executable instructions are executed by the processor, the processor performs the method according to any one of the first aspect or the possible designs of the first aspect.

A tenth aspect of this disclosure provides a terminal apparatus, including at least one processor, a memory, a transceiver, and computer-executable instructions that are stored in the memory and that can be run on the processor. When the computer-executable instructions are executed by the processor, the processor performs the method according to any one of the second aspect or the possible designs of the second aspect.

An eleventh aspect of this disclosure provides a terminal apparatus, including at least one processor, a memory, a transceiver, and computer-executable instructions that are stored in the memory and that can be run on the processor. When the computer-executable instructions are executed by the processor, the processor performs the method according to any one of the third aspect or the possible designs of the third aspect.

A twelfth aspect of this disclosure provides a terminal apparatus, including at least one processor, a memory, a transceiver, and computer-executable instructions that are stored in the memory and that can be run on the processor. When the computer-executable instructions are executed by the processor, the processor performs the method according to any one of the fourth aspect or the possible designs of the fourth aspect.

A thirteenth aspect of this disclosure provides a computer-readable storage medium storing one or more computer-executable instructions. When the computer-executable instructions are executed by a processor, the processor performs the method according to any one of the first aspect or the possible designs of the first aspect.

A fourteenth aspect of this disclosure provides a computer-readable storage medium storing one or more computer-executable instructions. When the computer-executable instructions are executed by a processor, the processor performs the method according to any one of the second aspect or the possible designs of the second aspect.

A fifteenth aspect of this disclosure provides a computer-readable storage medium storing one or more computer-executable instructions. When the computer-executable instructions are executed by a processor, the processor performs the method according to any one of the third aspect or the possible designs of the third aspect.

A sixteenth aspect of this disclosure provides a computer-readable storage medium storing one or more computer-executable instructions. When the computer-executable instructions are executed by a processor, the processor performs the method according to any one of the fourth aspect or the possible designs of the fourth aspect.

A seventeenth aspect of this disclosure provides a computer program product storing one or more computer-executable instructions. When the computer-executable instructions are executed by a processor, the processor performs the method according to any one of the first aspect or the possible designs of the first aspect.

An eighteenth aspect of this disclosure provides a computer program product storing one or more computer-executable instructions. When the computer-executable instructions are executed by a processor, the processor performs the method according to any one of the second aspect or the possible designs of the second aspect.

A nineteenth aspect of this disclosure provides a computer program product storing one or more computer-executable instructions. When the computer-executable instructions are executed by a processor, the processor performs the method according to any one of the third aspect or the possible designs of the third aspect.

A twentieth aspect of this disclosure provides a computer program product storing one or more computer-executable instructions. When the computer-executable instructions are executed by a processor, the processor performs the method according to any one of the fourth aspect or the possible designs of the fourth aspect.

The terminal apparatus described in the fifth aspect to the twelfth aspect may be a network device, a terminal, or a chip applied to the network device or the terminal, or may be another combined device, component, or the like that has functions of the foregoing network device or terminal.

When the terminal apparatus is the network device or the terminal, a receiving module may be a receiver, and may include an antenna, a radio frequency circuit, and the like. A processing module may be a processor, for example, a central processing unit (central processing unit, CPU). A sending module may be a transmitter, and may include an antenna, a radio frequency circuit, and the like. The receiver and the transmitter may be an integrated transceiver.

When the terminal apparatus is a component having functions of the foregoing network device or terminal, the receiving module may be a radio frequency unit, the processing module may be a processor, and the sending module may be a radio frequency unit.

When the terminal apparatus is a chip system, a receiving module may be an input port of the chip system, a processing module may be a processor of the chip system, and a sending module may be an output port of the chip system.

For technical effects brought by the fifth aspect, the ninth aspect, the thirteenth aspect, and the seventeenth aspect or any possible design thereof, refer to the technical effects brought by the first aspect or the different possible designs of the first aspect. Details are not described herein again.

For technical effects brought by the sixth aspect, the tenth aspect, the fourteenth aspect, and the eighteenth aspect or any possible design thereof, refer to the technical effects brought by the second aspect or the different possible designs of the second aspect. Details are not described herein again.

For technical effects brought by the seventh aspect, the eleventh aspect, the fifteenth aspect, and the nineteenth aspect or any possible design thereof, refer to the technical effects brought by the third aspect or the different possible designs of the third aspect. Details are not described herein again.

For technical effects brought by the eighth aspect, the twelfth aspect, the sixteenth aspect, and the twentieth aspect or any possible design thereof, refer to the technical effects brought by the fourth aspect or the different possible designs of the fourth aspect. Details are not described herein again.

In the embodiments of this disclosure, control information may be divided into two parts: the first control information and the second control information. The first control information may be received by performing blind detection for a few times. After the first control information is received, the second control information is received based on the first control information, and then the data is received. In this way, not only a quantity of blind detection times is reduced, but also efficiency of receiving the control information and the data is improved.

DESCRIPTION OF EMBODIMENTS

Figure 1:
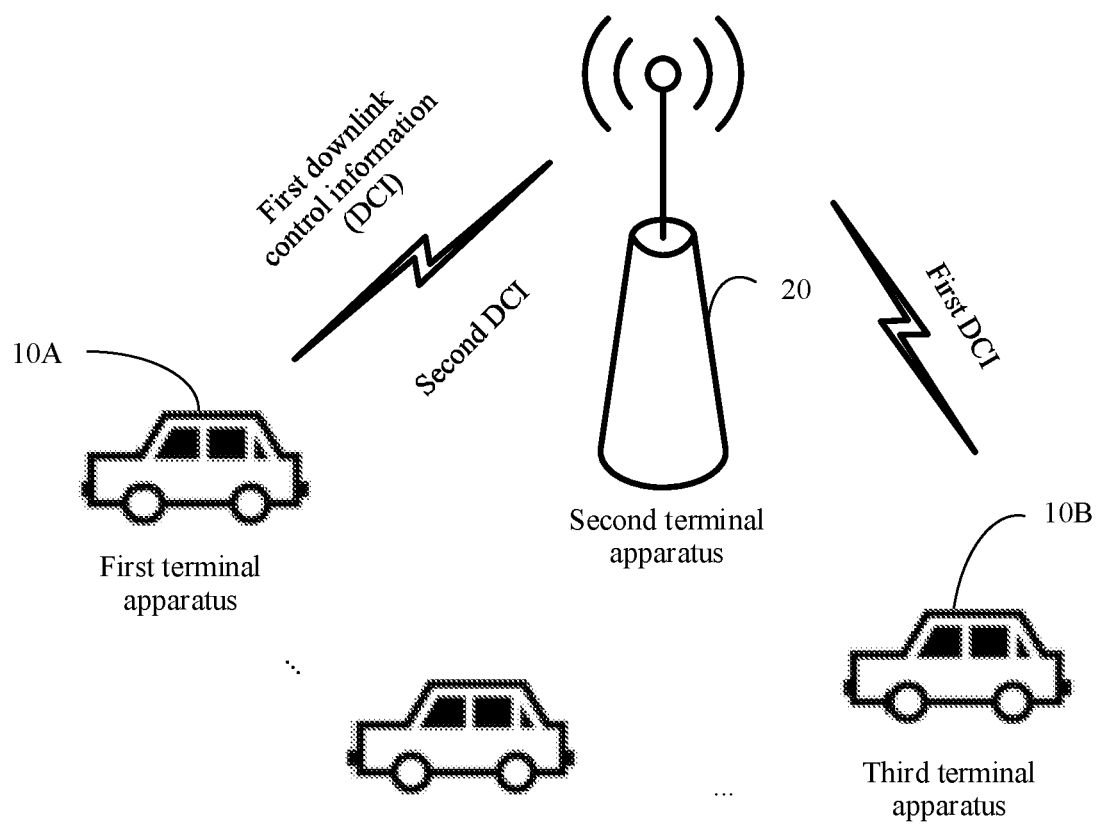
FIG. 1 is a schematic diagram of a main link scenario according to an embodiment of this disclosure.

The following describes the embodiments of this disclosure with reference to the accompanying drawings. Persons of ordinary skill in the art may learn that as technologies evolve and new scenarios emerge, the technical solutions provided in the embodiments of this disclosure are also applicable to a similar technical problem.

In this specification, claims, and the accompanying drawings of this disclosure, the terms "first", "second", and the like are intended to distinguish between similar objects but do not necessarily indicate a specific order or sequence. It should be understood that data termed in such a way is interchangeable in proper circumstances, so that the embodiments described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those steps or units, but may include other steps or units not expressly listed or inherent to such a process, method, system, product, or device.

The embodiments of this disclosure may be applied to a plurality of communication systems, including but not limited to a global system for mobile communications (Global System for Mobile Communications, GSM), a code division multiple access (Code Division Multiple Access, CDMA) system, a wideband code division multiple access (Wideband Code Division Multiple Access, WCDMA) system, a general packet radio service (general packet radio service, GPRS) system, a long term evolution (Long Term Evolution, LTE) system, a frequency division duplex long term evolution (frequency division duplex LTE, LTE-FDD) system, a time division duplex long term evolution (time division duplex LTE, LTE-TDD) system, a universal mobile telecommunications system (Universal Mobile Telecommunications System, UMTS), another wireless communication system that uses an orthogonal frequency division multiplexing (orthogonal frequency division multiplexing, OFDM) technology, a 5th generation (5th generation, 5G) communication system that is developing, and any future communication system that can be applied.

Embodiments of this disclosure provide a data receiving method. After first control information is received, second control information can be received based on the first control information, so that a quantity of blind detection times is reduced, thereby improving receiving efficiency. The embodiments of this disclosure further provide a corresponding terminal apparatus. The following provides detailed descriptions separately.

It should be noted that the terminal apparatus in the embodiments may be a network device, a terminal, or a chip applied to the network device or the terminal, or may be another combined device that has functions of the foregoing network device or terminal.

The terminal in the embodiments of this disclosure may include various handheld devices, vehicle-mounted devices, wearable devices, or computing devices that have a wireless communication function, or other processing devices connected to a wireless modem. The terminal may be a mobile station (Mobile Station, MS), a subscriber unit (subscriber unit), a cellular phone (cellular phone), a smartphone (smart phone), a wireless data card, a personal digital assistant (personal digital assistant, PDA for short) computer, a tablet computer, a wireless modem (modem), a handset (handset), a laptop computer (laptop computer), a machine type communication (Machine Type Communication, MTC) terminal, or the like.

The network device in the embodiments of this disclosure may be a base station (base station, BS), a NodeB, an evolved node base station (evolved node base station, eNB), or a gNodeB (gNB), a transmission point (transmission point, TRP), or a Wi-Fi access point (access point, AP) in a 5G system which is also referred to as new radio (new radio, NR). Certainly, the network device may be another network device that has a function similar to that of a base station and can send control information to the terminal.

The terminal may communicate with the network device, or may directly communicate with another terminal. Generally, a communication link between the network device and the terminal is referred to as a main link, and a communication link between terminals is referred to as a sidelink.

The embodiments of this disclosure relate to two scenarios: a main link scenario and a sidelink scenario. The following separately describes the two suitable scenarios with reference to the accompanying drawings.

FIG. 1 is a schematic diagram of a main link scenario according to an embodiment of this disclosure.

In the main link scenario shown in FIG. 1, a first terminal apparatus 10A is a terminal, a second terminal apparatus 20 is a network device, and a third terminal apparatus 10B is a terminal. When scheduling the terminal, the network device sends first downlink control information (downlink control information, DCI) and second DCI. The first DCI and the second DCI are sent by the network device for same to-be-sent data.

In this scenario, for ease of description, the terminal corresponding to the first terminal apparatus 10A may be referred to as a first terminal, and the terminal corresponding to the third terminal apparatus 10B may be referred to as a third terminal.

The first terminal and the third terminal first receive the first DCI. If the first terminal determines, based on the first DCI, that the first terminal is a terminal scheduled by the network device to receive the to-be-sent data, the first terminal receives the second DCI. If the third terminal determines, based on the first DCI, that the third terminal is not a terminal scheduled by the network device to receive the to-be-sent data, the third terminal does not receive the second DCI, and does not need to detect the second DCI.

The first DCI may include first identification information. The first terminal and the third terminal may determine, based on the first identification information, whether the first terminal and the third terminal are terminals scheduled by the network device to receive the to-be-sent data. The first identification information is used to indicate at least one terminal apparatus that needs to receive the to-be-sent data. If the first terminal belongs to the at least one terminal apparatus, the first terminal needs to receive the second DCI. If the third terminal does not belong to the at least one terminal apparatus, the third terminal does not need to receive the second DCI.

The first terminal may receive the to-be-sent data based on the first DCI and the second DCI.

In this scenario, a terminal belonging to the at least one terminal apparatus may be referred to as the first terminal apparatus 10A. A terminal not belonging to the at least one terminal apparatus may be referred to as the third terminal apparatus 10B. The third terminal apparatus needs to receive only the first DCI, and does not need to receive the second DCI. It should be noted that the first terminal apparatus 10A and the third terminal apparatus 10B respectively represent two types of terminals on a main link: one is scheduled by the second terminal apparatus 20, and the other is not scheduled by the second terminal apparatus 20, there may be one or more first terminal apparatuses 10A and one or more third terminal apparatuses 10B, and quantities in the accompanying drawings should not be understood as a limitation on quantities of first terminal apparatuses 10A and third terminal apparatuses 10B.

It can be learned from the main link scenario that, when determining, based on the first DCI, that the first terminal apparatus 10A is a terminal apparatus scheduled by the second terminal apparatus 20 to receive the to-be-sent data, the first terminal apparatus 10A may receive the second DCI based on the first DCI, so that a quantity of blind detection times can be reduced, thereby improving efficiency of receiving the second DCI, and further improving efficiency of receiving the data. When the third terminal apparatus 10B determines, based on the first DCI, that the third terminal apparatus 10B is not a terminal apparatus scheduled by the second terminal apparatus 20 to receive the to-be-sent data, the third terminal apparatus 10B does not need to receive the second DCI, and may not need to detect the second DCI. This can reduce detection costs and save detection resources.

In some embodiments, in the main link scenario corresponding to FIG. 1, the first DCI may further include first indication information, and the first indication information is used to indicate related information for receiving the second DCI. The first terminal apparatus 10A may receive the second DCI from the second terminal apparatus based on the first indication information, and receive the to-be-sent data based on the first DCI and the second DCI. The second DCI includes at least one of indication information about channel state information and indication information of feedback information for the to-be-sent data.

In some embodiments, if the first DCI includes scheduling information for the to-be-sent data, the first terminal apparatus 10A may alternatively receive the to-be-sent data based on the first DCI.

In some embodiments, the main link scenario corresponding to FIG. 1 may alternatively be:

A first terminal apparatus 10A is a terminal, a second terminal apparatus 20 is a network device, and a third terminal apparatus 10B is a terminal. When scheduling the terminal, the network device sends first DCI and second DCI. The first DCI and the second DCI are sent by the network device for different to-be-sent data.

In this scenario, for ease of description, the terminal corresponding to the first terminal apparatus 10A may be referred to as a first terminal, and the terminal corresponding to the third terminal apparatus 10B may be referred to as a third terminal.

Optionally, the first DCI schedules a first part of the to-be-sent data, and the second DCI schedules a second part of the to-be-sent data. Optionally, the first DCI schedules first to-be-sent data, and the second DCI schedules second to-be-sent data. The to-be-sent data may be data related to a specific service, for example, an ultra-reliable and low-latency communication (ultra reliable low latency communication, URLLC) service, or may be grant-free communication/data (grant free communication/data), or may be repeatedly transmitted data. The first terminal and the third terminal first receive the first DCI. If the first terminal determines, based on the first DCI, that the first terminal is a terminal scheduled by the network device to receive the to-be-sent data, the first terminal receives the second DCI. If the third terminal determines, based on the first DCI, that the third terminal is not a terminal scheduled by the network device to receive the to-be-sent data, the third terminal does not receive the second DCI, and does not need to detect the second DCI. The first terminal obtains the first part of the to-be-sent data based on the first DCI, and obtains the second part of the to-be-sent data based on the second DCI. Alternatively, the first terminal obtains the first to-be-sent data based on the first DCI, and obtains the second to-be-sent data based on the second DCI. The third terminal obtains the first part of the to-be-sent data based on the first DCI. Alternatively, the third terminal obtains the first to-be-sent data based on the first DCI. Alternatively, the third terminal determines a detected (or sensed) resource based on the first DCI, and does not obtain the first to-be-sent data or the first part of the to-be-sent data.

The first terminal and the third terminal may determine, based on first identification information, whether the first terminal and the third terminal are terminals scheduled by the network device to receive the to-be-sent data. The first identification information is used to indicate at least one terminal that needs to receive the to-be-sent data. If the first terminal belongs to the at least one terminal, the first terminal needs to receive the second DCI. If the third terminal does not belong to the at least one terminal, the third terminal does not need to receive the second DCI.

In this scenario, it can be learned from the foregoing descriptions that the first terminal belongs to the at least one terminal. The third terminal does not belong to the at least one terminal. Therefore, the third terminal needs to receive only the first DCI, and does not need to receive the second DCI. It should be noted that the first terminal and the third terminal respectively represent two types of terminals on a main link: one is scheduled by the network device, and the other is not scheduled by the network device, there may be one or more first terminals and one or more third terminals, and quantities in the accompanying drawings should not be understood as a limitation on quantities of first terminals and third terminals.

It can be learned from the main link scenario that, when determining, based on the first DCI, that the first terminal apparatus 10A is a terminal scheduled by the second terminal apparatus 20 to receive the to-be-sent data, the first terminal apparatus 10A may receive the second DCI based on the first DCI, so that a quantity of blind detection times can be reduced, thereby improving efficiency of receiving the second DCI, and further improving efficiency of receiving the data. When the third terminal apparatus 10B determines, based on the first DCI, that the third terminal apparatus 10B is not a terminal scheduled by the second terminal apparatus 20 to receive the to-be-sent data, the third terminal apparatus 10B does not need to receive the second DCI, and may not need to detect the second DCI. This can reduce detection costs and save detection resources.

Figure 2:
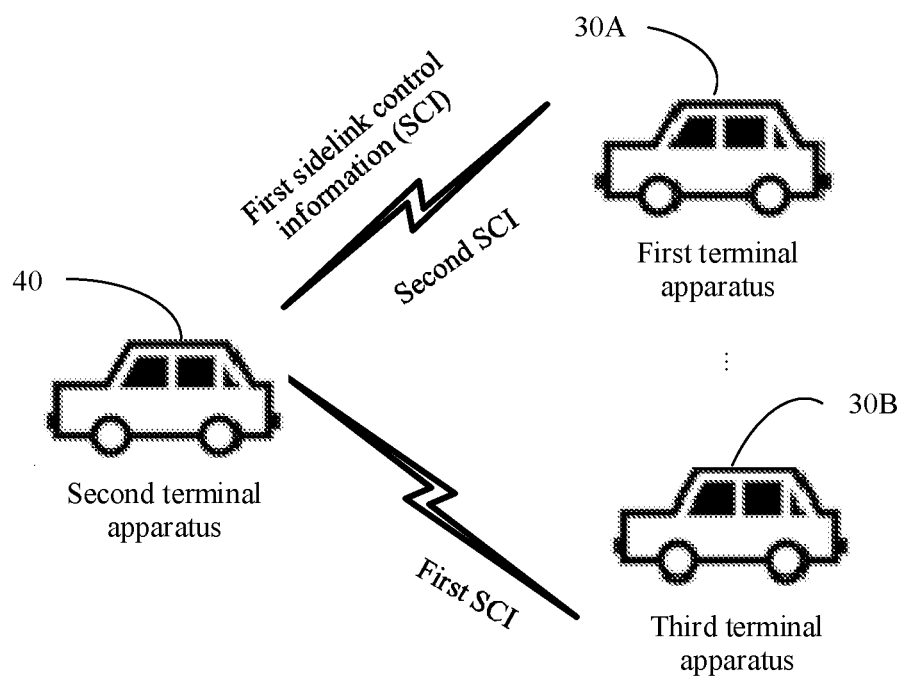
FIG. 2 is a schematic diagram of a sidelink scenario according to an embodiment of this disclosure.

FIG. 2 is a schematic diagram of a sidelink scenario according to an embodiment of this disclosure.

In the sidelink scenario shown in FIG. 2, a first terminal apparatus 30A is a terminal, a second terminal apparatus 40 is a terminal, and a third terminal apparatus 30B is a terminal. When scheduling the other terminal, the second terminal apparatus 40 sends first sidelink control information (sidelink control information, SCI) and second SCI. The first SCI and the second SCI are sent by the second terminal apparatus 40 for same to-be-sent data.

In this scenario, for ease of description, the terminal corresponding to the first terminal apparatus 30A may be referred to as a first terminal, and the terminal corresponding to the third terminal apparatus 30B may be referred to as a third terminal. The terminal corresponding to the second terminal apparatus 40 is referred to as a second terminal.

The terminals other than the second terminal on a sidelink first receives the first SCI. If the first terminal determines, based on the first SCI, that the first terminal is a terminal scheduled by the second terminal to receive the to-be-sent data, the first terminal receives the second SCI. If the third terminal determines, based on the first SCI, that the third terminal is not a terminal scheduled by the second terminal to receive the to-be-sent data, the third terminal does not receive the second SCI, and does not need to detect the second SCI.

The first SCI may include first identification information. The first terminal and the third terminal may determine, based on the first identification information, whether the first terminal and the third terminal are terminals scheduled by the second terminal to receive the to-be-sent data. The first identification information is used to indicate at least one terminal that needs to receive the to-be-sent data. If the first terminal belongs to the at least one terminal, the first terminal needs to receive the second SCI. If the third terminal does not belong to the at least one terminal, the third terminal does not need to receive the second SCI.

It should be noted that the first terminal apparatus 30A and the third terminal apparatus 30B respectively represent two types of terminals on a sidelink: one is scheduled by the second terminal apparatus 40, and the other is not scheduled by the second terminal apparatus 40, there may be one or more first terminal apparatuses 30A and one or more third terminal apparatuses 30B, and quantities in the accompanying drawings should not be understood as a limitation on quantities of first terminal apparatuses 30A and third terminal apparatuses 30B.

It can be learned from the sidelink scenario that, when determining, based on the first SCI, that the first terminal apparatus 30A is a terminal scheduled by the second terminal apparatus 40 to receive the to-be-sent data, the first terminal apparatus 30A may receive the second SCI based on the first SCI, so that a quantity of blind detection times can be reduced, thereby improving efficiency of receiving the second SCI. When the third terminal apparatus 30B determines, based on the first SCI, that the third terminal apparatus 30B is not a terminal scheduled by the second terminal apparatus 40 to receive the to-be-sent data, the third terminal apparatus 30B does not need to receive the second SCI, and may not need to detect the second SCI. This can reduce detection costs and save detection resources.

In some embodiments, in the sidelink scenario corresponding to FIG. 2, the first SCI may further include first indication information, and the first indication information is used to indicate related information for receiving the second SCI. The first terminal apparatus 10A may receive the second SCI from the second terminal apparatus based on the first indication information, and receive the to-be-sent data based on the first SCI and the second SCI. The second SCI includes at least one of indication information about channel state information and indication information of feedback information for the to-be-sent data.

In some embodiments, if the first SCI includes scheduling information for the to-be-sent data, the first terminal apparatus 10A may alternatively receive the to-be-sent data based on the first SCI.

In this embodiment of this disclosure, the SCI is usually control information used to schedule a physical sidelink shared channel (Physical sidelink shared channel, PSSCH) for data transmission. The SCI is usually located on a physical sidelink control channel (physical sidelink control channel, PSCCH).

In some embodiments, the sidelink scenario corresponding to FIG. 2 may alternatively be:

A first terminal apparatus 30A is a terminal, a second terminal apparatus 40 is a terminal, and a third terminal apparatus 30B is a terminal. When scheduling the other terminal, the second terminal apparatus 40 sends first SCI and second SCI. The first SCI and the second SCI are sent by the second terminal apparatus 40 for same to-be-sent data.

In this scenario, for ease of description, the terminal corresponding to the first terminal apparatus 30A may be referred to as a first terminal, and the terminal corresponding to the third terminal apparatus 30B may be referred to as a third terminal. The terminal corresponding to the second terminal apparatus 40 is referred to as a second terminal.

Optionally, the first SCI schedules a first part of the to-be-sent data, and the second SCI schedules a second part of the to-be-sent data. Optionally, the first SCI schedules first to-be-sent data, and the second SCI schedules second to-be-sent data. The to-be-sent data may be data related to a specific service, for example, an ultra-reliable and low-latency communication (ultra reliable low latency communication, URLLC) service, or may be grant-free communication/data (grant free communication/data), or may be repeatedly transmitted data. The terminals other than the second terminal on a sidelink first receives the first SCI. If the first terminal determines, based on the first SCI, that the first terminal is a terminal scheduled by the second terminal to receive the to-be-sent data, the first terminal receives the second SCI. If the third terminal determines, based on the first SCI, that the third terminal is not a terminal scheduled by the second terminal to receive the to-be-sent data, the third terminal does not receive the second SCI, and does not need to detect the second SCI. The first terminal obtains the first part of the to-be-sent data based on the first SCI, and obtains the second part of the to-be-sent data based on the second SCI. Alternatively, the first terminal obtains the first to-be-sent data based on the first SCI, and obtains the second to-be-sent data based on the second SCI. The third terminal obtains the first part of the to-be-sent data based on the first SCI. Alternatively, the third terminal obtains the first to-be-sent data based on the first SCI. Alternatively, the third terminal determines a detected (sense) resource based on the first SCI, and does not obtain the first to-be-sent data or the first part of the to-be-sent data.

The first terminal and the third terminal may determine, based on first identification information, whether the first terminal and the third terminal are terminals scheduled by the second terminal to receive the to-be-sent data. The first identification information is used to indicate at least one terminal apparatus that needs to receive the to-be-sent data. If the first terminal belongs to the at least one terminal apparatus, the first terminal needs to receive the second SCI. If the third terminal does not belong to the at least one terminal apparatus, the third terminal does not need to receive the second SCI.

It should be noted that the first terminal apparatus 30A and the third terminal apparatus 30B respectively represent two types of terminals on a sidelink: one is scheduled by the second terminal apparatus 40, and the other is not scheduled by the second terminal apparatus 40, there may be one or more first terminal apparatuses 30A and one or more third terminal apparatuses 30B, and quantities in the accompanying drawings should not be understood as a limitation on quantities of first terminal apparatuses 30A and third terminal apparatuses 30B.

It can be learned from the sidelink scenario that, when determining, based on the first SCI, that the first terminal apparatus 30A is a terminal scheduled by the second terminal apparatus 40 to receive the to-be-sent data, the first terminal apparatus 30A may receive the second SCI based on the first SCI, so that a quantity of blind detection times can be reduced, thereby improving efficiency of receiving the second SCI. When the third terminal apparatus 30B determines, based on the first SCI, that the third terminal apparatus 30B is not a terminal scheduled by the second terminal apparatus 40 to receive the to-be-sent data, the third terminal apparatus 30B does not need to receive the second SCI, and may not need to detect the second SCI. This can reduce detection costs and save detection resources.

The foregoing FIG. 1 and FIG. 2 are briefly described with reference to the main link and the sidelink. Actually, principles of the embodiments of this disclosure on both the main link and the sidelink are the same. The main link and the sidelink are no longer distinguished below, and the DCI and the SCI are no longer distinguished and are collectively referred to as control information. The data receiving method in the embodiments of this disclosure is described from perspectives of the first terminal apparatus, the second terminal apparatus, and the third terminal apparatus.

The first control information and the second control information described in the foregoing embodiments may be understood as two-level control information. In this application, the first control information may also be referred to as first-level control information, and the second control information may also be referred to as second-level control information. Control information not using a two-level division form may be referred to as third control information. Actually, the first control information may include the third control information. In other words, the third control information is partial information in the first control information. Alternatively, the first control information and the third control information may be different control information. That the first control information is different from the third control information may include that formats are different, and sizes may be the same or different, and may also include that format indication fields are different. In addition, the first control information and the third control information may be located in respective corresponding detection space. For example, the third control information may be SCI described in a current long term evolution (Long Term Evolution, LTE) vehicle to everything (vehicle to everything, V2X) system, or SCI redefined in a 5G system. The SCI redefined in the 5G system may still use an SCI format described in an LTE V2X system, or an additional bit is added to the SCI format in the LTE V2X system for definition.

In this application, the first identification information is indication information used to indicate a destination terminal apparatus. The destination terminal apparatus is a terminal apparatus that receives the to-be-sent data. The indication information for the destination terminal apparatus may be a target identifier (target ID/index) or a destination identifier (destination ID/index). In this application, "scheduling" may alternatively be replaced with indicating transmission. Information scheduling the to-be-sent data is information indicating transmission of the to-be-sent data, and scheduling information is information indicating data transmission.

In this application, the "resource for the to-be-sent data" may also be replaced with resource reservation or a reserved resource. The reserved resource includes one or a combination of a frequency resource for initial transmission, a frequency resource for retransmission, a time resource for initial transmission, or a time resource for retransmission. The time resource for retransmission may be an offset or a gap relative to the time resource for initial transmission. In addition, when the reserved resource includes indications for the resources for retransmission, an ordinal number of retransmission and a corresponding transport format may be further indicated. In addition, when the reserved resource includes an indication for the resource for initial transmission, a corresponding transport format may be further indicated.

In this application, the first identification information may be a layer 1 index (Layer 1 index/ID, L1 index/ID), or may be a layer 3 index (Layer 3 index/ID, L3 index/ID). Layer 1 is a physical (Physical, PHY) layer, and Layer 3 is a radio resource control (radio resource control, RRC) layer.

Figure 3:
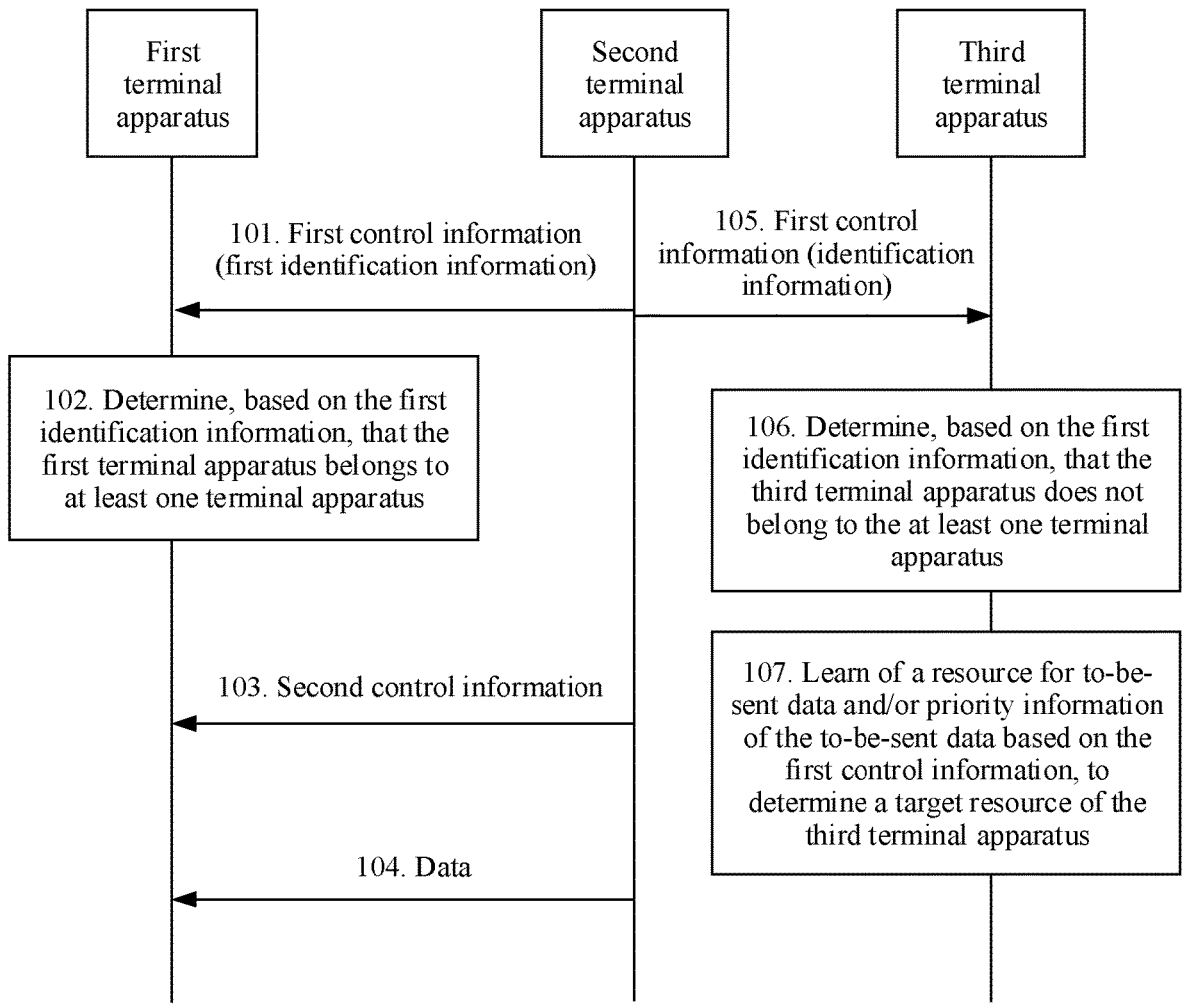
FIG. 3 is a schematic diagram of an embodiment of a data receiving and sending method according to an embodiment of this disclosure.

FIG. 3 is a schematic diagram of an embodiment of a data receiving method according to an embodiment of this disclosure.

As shown in FIG. 3, the embodiment of the data receiving and sending method provided in this embodiment of this disclosure may include the following steps.

101. A first terminal apparatus receives first control information from a second terminal apparatus, and correspondingly the second terminal apparatus sends the first control information.

The first control information is used to indicate a resource for to-be-sent data of the second terminal apparatus and/or a priority of the to-be-sent data, the first control information includes first identification information, and the first identification information is used to indicate at least one terminal apparatus that needs to receive the to-be-sent data.

Alternatively, the first control information is used to indicate a resource for to-be-sent data of the second terminal apparatus and/or a priority of the to-be-sent data. In the first control information, when the first identification information is not explicitly indicated, the first identification information may be implicitly deduced from a resource on which the first control information is located, the first identification information may be implicitly deduced from a resource that is for second control information and that corresponds to the resource on which the first control information is located, or the first identification information may be preconfigured identification information. The first identification information is used to indicate the at least one terminal apparatus that needs to receive the to-be-sent data.

In this embodiment of this disclosure, a reference signal mode or a reference signal resource identifier implicitly indicates an aggregation level of the second control information, resource information of the second control information, or the like. The reference signal mode or the reference signal resource identifier may be a reference signal mode or a reference signal resource identifier used when the first control information is sent, may be a reference signal mode or a reference signal resource identifier used when data scheduled by the first control information is sent, or may be indication information that is carried in the first control information and that is of a reference signal mode or a reference signal resource identifier.

Optionally, before step 101, the method may further include: The second terminal apparatus determines the at least one terminal apparatus that needs to receive the to-be-sent data.

In this embodiment of this disclosure, the resource for the to-be-sent data may be at least one of a time domain resource, a frequency domain resource, or another resource that needs to be occupied when the second terminal apparatus sends the to-be-sent data.

Priority information of the to-be-sent data may be ProSe Per-Packet Priority (ProSe Per-Packet Priority, PPPP), or may be QoS-related representation information. The QoS-related representation information may be a 5QI (QoS Index), QoS-related level division newly defined in a 5G system, or PPPP evolution.

The at least one terminal apparatus in this embodiment of this disclosure is a terminal apparatus that needs to receive the to-be-sent data, and a terminal apparatus belonging to the at least one terminal apparatus may be referred to as a first terminal apparatus. A terminal apparatus not belonging to the at least one terminal apparatus may be referred to as a third terminal apparatus.

Generally, a scheduling service includes broadcast broadcast, groupcast groupcast, or unicast unicast. If the scheduling service is broadcast or groupcast, there is at least one first terminal apparatus. For example, there may be two or more first terminal apparatuses. If the scheduling service is unicast, there is one first terminal apparatus. In other words, in a broadcast or groupcast scenario, there are two or more terminal apparatuses that need to receive the to-be-sent data.

In a unicast scenario, there is one terminal apparatus that needs to receive the to-be-sent data.

The first identification information may include one or more identifiers. For example, the first identification information is one of the following identifiers:
 an identifier of each terminal apparatus in the at least one terminal apparatus;
 an identifier of a pair formed by each terminal apparatus in the at least one terminal apparatus and the second terminal apparatus;
 an identifier of a group to which the at least one terminal apparatus belongs;
 a radio network temporary identifier RNTI of each terminal apparatus in the at least one terminal apparatus;
 an RNTI of a pair formed by each terminal apparatus in the at least one terminal apparatus and the second terminal apparatus; or
 an RNTI of a group to which the at least one terminal apparatus belongs.

102. The first terminal apparatus determines, based on the first identification information, that the first terminal apparatus belongs to the at least one terminal apparatus.

The first terminal apparatus may determine whether the first terminal apparatus belongs to the at least one terminal apparatus, provided that the first terminal apparatus compares corresponding identification information of the first terminal apparatus with the first identification information. If the first terminal apparatus belongs to the at least one terminal apparatus, the first terminal apparatus learns that the first terminal apparatus needs to detect the second control information.

If the first terminal apparatus does not belong to the at least one terminal apparatus, the first terminal apparatus does not need to detect the second control information.

103. The first terminal apparatus receives the second control information from the second terminal apparatus, and correspondingly the second terminal apparatus sends the second control information.

The second control information includes at least one of transport format information of the to-be-sent data, indication information about channel state information (channel state information, CSI), and indication information of feedback information for the to-be-sent data.

Optionally, the second control information may also include MIMO-related indication information.

The channel state information is a feedback, for the to-be-sent data, about a channel state. That is, the channel state information is reference signal information sent by the second terminal apparatus to the first terminal apparatus, and/or feedback information sent by the first terminal apparatus to the second terminal apparatus. The channel state information includes at least one of: channel state information (for example, channel quality information/index, CQI), a subband CQI, reference signal received power (reference signal receiving/received power, RSRP), subband RSRP, reference signal received quality (reference signal receiving/received quality, RSRQ), subband RSRQ, a precoding matrix index (precoding matrix index, PMI), a rank index (Rank index, RI), or the like.

The feedback information may be at least one of a hybrid automatic repeat request (hybrid automatic repeat request, HARQ), an ACK, a NACK, or the like. The feedback information is a feedback for the to-be-sent data, that is, the feedback information sent by the first terminal apparatus to the second terminal apparatus.

The indication information about the channel state information is used to indicate at least one of the following information:
- whether the at least one terminal apparatus needs to feed back the channel state information;
- a type of the channel state information that needs to be fed back by the at least one terminal apparatus;
- whether to send a reference signal to feed back the channel state information;
- an identifier of a sent reference signal resource, where
- the channel state information that needs to be fed back by the at least one terminal apparatus is located on a long physical uplink control channel (physical uplink control channel, PUCCH), a short PUCCH, or a physical uplink shared channel (physical uplink share channel, PUSCH); or
- a resource on which the channel state information that needs to be fed back by the at least one terminal apparatus is located.

The reference signal may be an RS in a CSI-RS/CSI-RS pattern (pattern) or a DMRS/DMRS pattern, or an RS specially defined for an SL. The reference signal is a reference signal separately sent or sent together with a PSSSH.

The indication information of the feedback information for the to-be-sent data is used to indicate at least one of the following information:
- indication information indicating whether the at least one terminal apparatus needs to send the feedback information for the to-be-sent data;
- a resource used by the at least one terminal apparatus to send the indication information of the feedback information for the to-be-sent data; or
- an offset for delaying the feedback, if timing used by the at least one terminal apparatus to send the indication information of the feedback information for the to-be-sent data cannot meet preconfigured timing.

If the first terminal apparatus belongs to the at least one terminal apparatus, the first terminal apparatus needs to receive the second control information, and perform a subsequent data sending or receiving process.

104. The first terminal apparatus receives the to-be-sent data based on the first control information and the second control information, and correspondingly the second terminal apparatus sends the to-be-sent data.

When receiving the to-be-sent data, the first terminal apparatus may determine, based on the resource for the to-be-sent data and/or the priority of the to-be-sent data, a transmission resource for receiving to-be-received data, to receive the corresponding data.

The to-be-received data of the first terminal apparatus and the to-be-sent data of the second terminal apparatus are same data.

When the first control information and the second control information are control information sent for different data, step 104 may be that the first terminal apparatus receives the to-be-received data based on the first control information and/or the second control information. In other words, the first terminal apparatus receives a first part of the to-be-received data based on the first control information, and/or receives a second part of the to-be-received based on the second control information. Alternatively, the first terminal apparatus receives first to-be-received data based on the first control information, and/or receives second to-be-received data based on the second control information. Correspondingly, the first terminal apparatus may combine the first part of the to-be-received data and the second part of the to-be-received data that are received. Alternatively, the first terminal apparatus may combine the received first data and second data.

According to both the data receiving method described from the perspective of the first terminal apparatus and the data sending method described from the perspective of the second terminal apparatus, the first control information and the second control information for the same to-be-sent data may be separately received and sent. In this way, the first terminal apparatus that needs to receive the to-be-sent data can quickly receive the second control information based on the first control information, and further receive the to-be-sent data, thereby improving data receiving efficiency.

In addition, in this embodiment of this disclosure, for the third terminal apparatus not belonging to the at least one terminal apparatus, the third terminal apparatus may receive only the first control information, and does not need to further receive the second control information, so that the third terminal apparatus can also save detection resources for the second control information.

Still referring to FIG. 3, the following describes, by using steps 105 to 107 in FIG. 3, operations performed by the third terminal apparatus after the second terminal apparatus sends the first control information.

105. The third terminal apparatus receives the first control information from the second terminal apparatus.

106. The third terminal apparatus determines, based on the first identification information, that the third terminal apparatus does not belong to the at least one terminal apparatus.

If the third terminal apparatus does not belong to the at least one terminal apparatus, the third terminal apparatus does not need to receive the second control information.

Steps 105 and 106 may be understood with reference to steps 101 and 102 described above, and details are not described herein.

107. The third terminal apparatus learns of the resource for the to-be-sent data and/or the priority information of the to-be-sent data based on the first control information, to determine a target resource of the third terminal apparatus.

Optionally, the third terminal apparatus may select a different resource as the target resource of the third terminal apparatus without using the resource that is for the to-be-sent data and that is indicated by the first control information.

Optionally, the third terminal apparatus may determine, based on priority information of the third terminal apparatus and the priority information indicated by the first control information, whether the resource that is for the to-be-sent data and that is indicated by the first control information can be occupied. When the resource can be occupied, the target resource determined by the third terminal apparatus may partially overlap the resource that is for the to-be-sent data and that is indicated by the first control information, or completely overlap the resource that is for the to-be-sent data and that is indicated by the first control information. When the resource cannot be occupied, the third terminal apparatus selects a different resource as the target resource of the third terminal apparatus.

The target resource determined by the third terminal apparatus is used by the third terminal apparatus to send or receive data.

In some embodiments, a format of the first control information is different from a format of the second control information. The format may include a size, a domain, a class, a segment, or the like. That formats are different may mean that sizes, domains, classes, segments, or the like are different, or two or more items of sizes, domains, classes, or segments are different.

In some embodiments, the first control information and the second control information may include same content. For example, when the first control information and the second control information are control information sent for different data, the first control information and the second control information may include same content.

In some embodiments, the first control information and the second control information may include different content. For example, when the first control information and the second control information are control information sent for same data, the first control information and the second control information may include different content. Generally, there are two solutions.

In both a first solution and a second solution below, the first control information includes the resource for the to-be-sent data and/or the priority of the to-be-sent data, and first indication information. The first indication information is the indication information about the second control information.

Differences between the first solution and the second solution are as follows:

In the first solution, the first control information does not include any scheduling information, and the second control information includes all scheduling information used for any one or more of broadcast, groupcast, and unicast.

In the second solution, the first control information includes basic scheduling information used for any one or more of broadcast, groupcast, and unicast, and the second control information includes specific scheduling information used for groupcast and unicast.

In this application, "scheduling" may alternatively be replaced with indicating transmission, and scheduling information is information indicating data transmission. The basic scheduling information is transport format information used for transmission of the to-be-sent data, and the specific scheduling information is the indication information about the channel state information or the indication information of the feedback information for the to-be-sent data.

In some embodiments, in the second solution, the first control information further includes at least one of the following information: a modulation and coding scheme (modulation and coding scheme, MCS) of the to-be-sent data, a new data indicator (new data indicator, NDI), a redundancy version (redundancy version, RV), a repetition number (repetition number), or an aggregation level of a resource for transmitting the second control information. The at least one of the information may be referred to as the basic scheduling information. Alternatively, the aggregation level of the resource for transmitting the second control information may not belong to the basic scheduling information, and the aggregation level of the resource for transmitting the second control information may be used as the indication information of the second control information. Detailed descriptions are provided below when the indication information of the second control information is described.

In some embodiments, regardless of the first solution or the second solution, the second control information includes at least one of the transport format information of the to-be-sent data, the indication information about the state information, and the indication information of the feedback information for the to-be-sent data.

The channel state information is a feedback, for the to-be-sent data, about a channel state. That is, the channel state information is reference signal information sent by the second terminal apparatus to the first terminal apparatus, and/or feedback information sent by the first terminal apparatus to the second terminal apparatus. The channel state information includes at least one of: channel state information (channel quality information/index, CQI), a subband CQI, reference signal received power (reference signal receiving/received power, RSRP), subband RSRP, reference signal received quality (reference signal receiving/received quality, RSRQ), subband RSRQ, a precoding matrix index (precoding matrix index, PMI), a rank index (Rank index, RI), or the like.

The feedback information may be at least one of a hybrid automatic repeat request (hybrid automatic repeat request, HARQ), an ACK, a NACK, or the like. The feedback information is a feedback for the to-be-sent data, that is, the feedback information sent by the first terminal apparatus to the second terminal apparatus.

The indication information about the channel state information is used to indicate at least one of the following information:
  whether the at least one terminal apparatus needs to feed back the channel state information;
  a type of the channel state information that needs to be fed back by the at least one terminal apparatus;
  whether to send a reference signal to feed back the channel state information;
  an identifier of a sent reference signal resource, where
  the channel state information that needs to be fed back by the at least one terminal apparatus is located on a long PUCCH, a short PUCCH, or a PUSCH; or
  a resource on which the channel state information that needs to be fed back by the at least one terminal apparatus is located.

The reference signal may be a CSI-RS, or may be an RS specially defined for an SL.

The indication information of the feedback information for the to-be-sent data is used to indicate at least one of the following information:
  whether the at least one terminal apparatus needs to send the feedback information for the to-be-sent data;
  a resource used by the at least one terminal apparatus to send the feedback information for the to-be-sent data; or
  an offset for delaying the feedback, if timing (timing) used by the at least one terminal apparatus to send the feedback information for the to-be-sent data cannot meet preconfigured timing. The resource used by the at least one terminal apparatus to send the feedback information for the to-be-sent data may include the timing (timing).

Whether the channel state information needs to be fed back may be indicated in a form of 0 or 1, or may certainly be indicated in another form.

The type of the channel state information that needs to be fed back by the at least one terminal apparatus may include at least one of: channel state information (channel quality information/index, CQI), a subband CQI, reference signal received power (reference signal receiving/received power, RSRP), subband RSRP, reference signal received quality (reference signal receiving/received quality, RSRQ), subband RSRQ, a precoding identifier (precoding matrix index, PMI), a rank index (Rank index, RI), or the like.

Whether the at least one terminal apparatus needs to send the feedback information for the to-be-sent data may be indicated in a form of 0 or 1, or may certainly be indicated in another form.

The resource used by the at least one terminal apparatus to send the feedback information for the to-be-sent data may be one or more of a time domain resource, a frequency domain resource, or a spatial domain resource. The timing (timing) used by the at least one terminal apparatus to send the feedback information for the to-be-sent data may be an offset relative to a time point at which data is currently sent or an offset relative to a preset time point (or called as timing occasion). The preset time point may be a feedback time point configured by the network device, or may be one or more fixed feedback time points. The preset time point described herein is one or more time points configured by the network device. For example, the preset time point may be set to specific slots. Specifically, when 1024 slots are used as an example, the preset time point is slots 1, 3, and 5, and the like. Alternatively, the preset time point may be set to slots that use a value as a period, for example, slots 10, 110, and 210, and the like that use 100 slots as a period.

When the first solution and the second solution are introduced, the foregoing already describes that the first control information in both the first solution and the second solution includes the resource for the to-be-sent data and/or the priority of the to-be-sent data, and the first indication information.

The first indication information is the indication information about the second control information.

The foregoing describes that the information about the aggregation level of the resource for transmitting the second control information may also belong to the indication information of the second control information. In this case, the information about the aggregation level of the resource for transmitting the second control information also belongs to the first indication information.

The resource information of the second control information may also be considered as the indication information of the second control information.

Therefore, the first indication information, that is, the indication information of the second control information includes the aggregation level of the resource for the second control information and/or the resource information of the second control information.

The first indication information may include any one or a combination of the following four types:

Type 1: Including indication information about whether to receive the second control information is included. Optionally, the inclusion may be including only the indication information about whether to receive the second control information.

Type 2: Including the first identification information in step 101. Optionally, the inclusion may be including only the first identification information in step 101.

Type 3: Including the resource information of the second control information.

Type 4: Including the information about the aggregation level of the resource for transmitting the second control information.

The following separately describes any one or a combination of the foregoing four types.

For a case including only Type 1: including indication information about whether to receive the second control information, the indication information about whether to receive the second control information may be indicated by using one bit. For example, if the bit is 1, it indicates to receive the second control information; or if the bit is 0, it indicates not to receive the second control information. Certainly, an indication method is not limited to the method of using 1 or 0, and may alternatively be another method, for example, T or F, or another indication method. The indication method is also not limited to using only one bit for indication. A specific form is not limited in this embodiment of this disclosure, provided that whether to receive the second control information can be indicated.

If the second control information does not need to be received, the first terminal apparatus may determine a target resource based on the resource for the to-be-sent data and/or the priority of the to-be-sent data, and then receive or send data by using the target resource. If the second control information needs to be received, the second control information may be received through blind detection.

For a case of including only Type 2: including the first identification information in step 101, an executing process of this case is basically the same as the process in the embodiment corresponding to FIG. 3. After it is determined, based on the first identification information, that the first terminal apparatus belongs to the at least one terminal apparatus, the second control information is received. If the first terminal apparatus does not belong to the at least one terminal apparatus, the second control information is not received.

For a case including Type 1 and Type 3: including the resource information of the second control information, the second control information needs to be received based on the resource information of the second control information.

For a case of including Type 2 and Type 3: including the first identification information in step 101 and the resource information of the second control information, if the first identification information indicates that the first terminal apparatus does not belong to the at least one terminal apparatus, refer to the foregoing descriptions of Type 2 for understanding. If the first identification information indicates that the first terminal apparatus belongs to the at least one terminal apparatus, the second control information is received based on the resource information of the second control information.

For a case including Type 2 and Type 4: including the first identification information in step 101 and the information about the aggregation level of the resource for the second control information, if the first identification information indicates that the first terminal apparatus does not belong to the at least one terminal apparatus, refer to the foregoing descriptions of Type 2 for understanding. If the first identification information indicates that the first terminal apparatus belongs to the at least one terminal apparatus, the second control information is received based on the information about the aggregation level of the second control information.

For a case including Type 2, Type 3, and Type 4, if the first identification information indicates that the first terminal apparatus does not belong to the at least one terminal apparatus, refer to the foregoing descriptions of Type 2 for understanding. If the first identification information indicates that the first terminal apparatus belongs to the at least one terminal apparatus, the second control information is received based on the information about the aggregation level of the second control information, and the resource information.

The identification information in this embodiment of this disclosure may include at least one of the following:

an identifier of each terminal apparatus in the at least one terminal apparatus;

an identifier of a terminal apparatus in the at least one terminal apparatus; and an identifier of a pair formed by each terminal apparatus in the at least one terminal apparatus and the second terminal apparatus;

an identifier of a pair formed by a terminal apparatus in the at least one terminal apparatus and the second terminal apparatus;

an identifier of a group to which the at least one terminal apparatus belongs;

a radio network temporary identifier (radio network temporary identifier, RNTI) of each terminal apparatus in the at least one terminal apparatus;

a radio network temporary identifier (radio network temporary identifier, RNTI) of a terminal apparatus in the at least one terminal apparatus;

an RNTI of a pair formed by each terminal apparatus in the at least one terminal apparatus and the second terminal apparatus;

an RNTI of a pair formed by a terminal apparatus in the at least one terminal apparatus and the second terminal apparatus; or an RNTI of a group to which the at least one terminal apparatus belongs.

The pair may be a unicast service pair, and the group may be a groupcast service group or a broadcast service group. Certainly, in another scenario or another service, the pair and the group may also have other meanings.

The identifier of each terminal apparatus in the at least one terminal apparatus or the identifier of the terminal apparatus in the at least one terminal apparatus includes one or a combination of the following: an identifier of a source terminal apparatus, an identifier of a destination terminal apparatus, or an identifier of a target terminal apparatus.

The RNTI of each terminal apparatus in the at least one terminal apparatus or the RNTI of the terminal apparatus in the at least one terminal apparatus includes: an RNTI of a source terminal apparatus, an RNTI of a destination terminal apparatus, or an RNTI of a target terminal apparatus.

In some embodiments, the identifier of each terminal apparatus in the at least one terminal apparatus and the identifier of the terminal apparatus in the at least one terminal apparatus may be explained as follows:

The identifier of the terminal apparatus may be a part of a complete identifier of the terminal apparatus. For example, the complete identifier of the terminal apparatus is X bits, and the X bits include a part 1, a part 2, and a part 3. The identifier of the terminal apparatus may be any part of the X bits: the part 1, the part 2, or the part 3. Lengths of the three parts of bits may be equal, incompletely equal, or completely unequal.

The identifier of the terminal apparatus may alternatively be a combination of parts of the complete identifier of the terminal apparatus. For example, the complete identifier of the terminal apparatus is X bits, and the X bits include a part 1, a part 2, and a part 3. The identifier of the terminal apparatus is a combination of any two or more parts of the X bits, for example, a combination of the part 2 and the part 3. The combination may be addition, or the like. The addition may be modulo-2 addition, or the like. Lengths of the three parts of bits may be equal, incompletely equal, or completely unequal.

In some embodiments, the RNTI of each terminal apparatus in the at least one terminal apparatus and the RNTI of the terminal apparatus of the at least one terminal apparatus may be explained as follows:

The RNTI of the terminal apparatus may be a part of a complete RNTI of the terminal apparatus. For example, the complete RNTI of the terminal apparatus is X bits, and the X bits include a part 1, a part 2, and a part 3. The RNTI of the terminal apparatus may be any part of the X bits: the part 1, the part 2, or the part 3. Lengths of the three parts of bits may be equal, incompletely equal, or completely unequal.

The RNTI of the terminal apparatus may alternatively be a combination of parts of the complete RNTI of the terminal apparatus. For example, the complete RNTI of the terminal apparatus is X bits, and the X bits include a part 1, a part 2, and a part 3. The RNTI of the terminal apparatus is a combination of any two or more parts of the X bits, for example, a combination of the part 2 and the part 3. The combination may be addition, or the like. The addition may be modulo-2 addition, or the like. Lengths of the three parts of bits may be equal, incompletely equal, or completely unequal.

In conclusion, the identifier of each terminal apparatus in the at least one terminal apparatus, the RNTI of each terminal apparatus in the at least one terminal apparatus, the identifier of the group, the identifier of the pair, the RNTI of the group, the RNTI of the pair, the RNTI of the source terminal, the RNTI of the destination terminal or the RNTI of the target terminal, the identifier of the source terminal, or the identifier of the destination terminal or the identifier of the target terminal is used to indicate specific terminal apparatuses that need to receive the second control information.

In this application, the identifier may be represented as an index or an ID (identification).

It should be noted that the at least one terminal apparatus may be understood as a set of terminal apparatuses, and each terminal apparatus refers to any terminal apparatus included in the set of terminal apparatuses. One terminal apparatus has one identifier. For example, there are five terminal apparatuses in the set of terminal apparatuses, and the identifier of each terminal apparatus refers to an identifier of each of the five terminal apparatuses, for example, T1, T2, T3, T4, or T5. Similarly, the RNTI of each terminal apparatus and the identifier of the pair may also be understood in this way. However, the terminal apparatus refers to one or more terminal apparatuses included in the set of terminal apparatuses. One terminal apparatus has one identifier. For example, there are five terminal apparatuses in the set of terminal apparatuses, and the identifier of the terminal apparatus refers to any one or three respective identifiers of the five terminal apparatuses, for example, T1, or T1, T2, and T3. Similarly, the RNTI of each terminal apparatus and the identifier of the pair may also be understood in this way.

The resource information of the second control information is used to indicate a place at which the second control information may be received. The following describes the resource information of the second control information in this embodiment of this disclosure.

In some embodiments, the resource information of the second control information indicates a resource for transmitting the second control information.

That the first terminal apparatus receives the second control information from the second terminal apparatus may include:

The first terminal apparatus receives the second control information from the resource for transmitting the second control information.

In some embodiments, the resource information of the second control information indicates a location relationship between the resource for transmitting the second control information and a resource for transmitting the first control information.

In this case, the method may further include:

The first terminal apparatus determines, based on the location relationship and the resource for transmitting the first control information, the resource for transmitting the second control information.

That the first terminal apparatus receives the second control information from the second terminal apparatus may include:

The first terminal apparatus receives the second control information from the resource for transmitting the second control information.

In some embodiments, the resource for transmitting the second control information may include at least one of the following:
- a time domain resource for transmitting the second control information;
- a frequency domain resource for transmitting the second control information; or
- a spatial domain resource for transmitting the second control information.

In some embodiments, the time domain resource of the second control information may be indicated by using one or more resource symbols or subchannel identifiers.

Certainly, the resource symbol or the subchannel identifier may not be included in the first control information, or may be separately notified by using, for example, radio resource control (radio resource control, RRC) signaling.

In this embodiment of this disclosure, the time/time domain resource may be as follows: A time domain unit includes at least one of a super frame, a frame, a slot (slot), a subframe, a mini-subframe, a mini-slot (or a mini-slot mini-slot), an OFDM symbol, or a time unit less than one OFDM symbol.

The frequency domain resource may be as follows: A frequency domain unit includes at least one of a frequency band, a subband, a subchannel (subchannel), a bandwidth part (bandwidth part, BWP), a control channel element (control channel element, CCE), a resource element (Resource element, RE), or a physical resource block (Physical resource block, PRB). The subchannel is N PRBs or N REs, where N is a positive integer.

The spatial domain resource may be: A spatial domain unit includes at least one of a beam or an antenna port. A length of the mini-subframe is less than a length of the subframe, and a length of the mini-slot is less than a length of the slot.

The frequency domain resource may include any one or a combination of the control channel element (control channel element, CCE) or a control resource set (control resource set, CORSET).

That the first terminal apparatus determines, based on the location relationship and the resource for transmitting the first control information, the resource for transmitting the second control information may include:

When the first control information is located in a first control channel element CCE, the first terminal apparatus determines, based on the first CCE and the location relationship, that the second control information is located in a second CCE;

when the first control information is located in a first time domain unit, the first terminal apparatus determines, based on the first time domain unit and the location relationship, that the second control information is located in a second time domain unit; or when the first control information is located in a first control resource set CORSET, the first terminal apparatus determines, based on the first CORSET and the location relationship, that the second control information is located in a second CORSET.

The first time domain unit or the second time domain unit may be a symbol, for example, an orthogonal frequency division multiplexing (orthogonal frequency division multiplexing, OFDM) symbol. In addition to a symbol, the first time domain unit or the second time domain unit may be one or a combination of a slot (slot) and a subframe (subframes).

In addition, alternatively, the first control information may be located in a first search space, the second control information may be located in a second search space, and the first search space is different from the second search space.

Herein, that the first search space and the second search space are different may mean that the two search spaces overlap, the two search spaces do not overlap at all, or the two search spaces do not completely overlap.

In addition, third control information may be located in the first search space, and the third control information and the first control information share one search space. Alternatively, the third control information may be located in a third search space, and the third control information and the first control information separately use respective search spaces.

The first control information is usually not scrambled by using an RNTI, or is scrambled by using a first RNTI. The first RNTI is an RNTI with a relatively short bit length, and is preconfigured for the terminal apparatus.

The second control information is scrambled by using a second RNTI. The second RNTI is an RNTI corresponding to a group, an RNTI corresponding to a terminal apparatus pair, an RNTI of a destination terminal apparatus, or an RNTI of a source terminal apparatus, or a combination of these types of RNTIs. The second RNTI is preconfigured for the terminal apparatus. These types of RNTIs include any one or more of the RNTI corresponding to the group, the RNTI corresponding to the terminal apparatus pair, the RNTI of the destination terminal apparatus, or the RNTI of the source terminal apparatus. In this embodiment, the source terminal apparatus is the second terminal apparatus, and the destination terminal apparatus is the first terminal apparatus.

All preconfigurations in this application may be indicated by the network device to the terminal apparatus by using at least one of RRC signaling, MAC signaling, or physical layer signaling, or may be preset in either of the network device and the terminal apparatus.

In some embodiments, the location relationship between the resource for transmitting the second control information and the resource for transmitting the first control information may include:
- an offset of a time domain resource for transmitting the second control information relative to a time domain resource for transmitting the first control information;
- an offset of a frequency domain resource for transmitting the second control information relative to a frequency domain resource for transmitting the first control information; or
- an offset of a spatial domain resource for transmitting the second control information relative to a spatial domain resource for transmitting the first control information.

Actually, the location relationship is not limited to the foregoing types. For example, the first control information is SCI 1, and the second control information is SCI 2. A location relationship between a resource for the SCI 1 and a resource for the SCI 2 may be any one of the following:

a resource offset of a frequency domain resource for the SCI 2 relative to a frequency domain resource for the SCI 1;

a resource offset of a time domain resource for the SCI 2 relative to a frequency domain resource for the SCI 1;

a resource offset of a time domain resource and a frequency domain resource for the SCI 2 relative to a frequency domain resource for the SCI 1;

a resource offset of a frequency domain resource for the SCI 2 relative to a time domain resource of the SCI 1;

a resource offset of a time domain resource for the SCI 2 relative to a time domain resource for the SCI 1;

a resource offset of a time domain resource and a frequency domain resource for the SCI 2 relative to a time domain resource for the SCI 1;

a resource offset of a frequency domain resource for the SCI 2 relative to a time domain resource and a frequency domain resource for the SCI 1;

a resource offset of a time domain resource for the SCI 2 relative to a time domain resource and a frequency domain resource for the SCI 1; or a resource offset of a time domain resource and a frequency domain resource for the SCI 2 relative to a time domain resource and a frequency domain resource for the SCI 1.

The resource offsets in the foregoing combination relationships may be obtained by preconfiguring a mapping relationship between a combined resource and a resource offset.

When there are a plurality of location relationships, the location relationships may correspond to corresponding indexes (index), and the SCI 1 includes indications of the indexes. Alternatively, an index of a used location relationship is indicated by using radio resource control RRC signaling. In this way, the first terminal apparatus detecting the SCI 1 or the first terminal apparatus detecting the RRC signaling learns of a specific location relationship based on which the first terminal apparatus can detect the SCI 2, thereby minimizing detection overheads.

Content in the first control information and the second control information is described as an example based on the first solution and the second solution. It should be noted that the example used here does not constitute a limitation on the content included in the first control information and the second control information.

An example in which the first control information is SCI 1 and the second control information is SCI 2 is still used, and the first solution may be represented as follows:

The following is an example of related fields of the SCI 1:

PPPP (or a 5QI, or QoS-related indication information),
resources occupied in time/frequency domain,
an identifier of at least one terminal device,
[resource information, an aggregation level (aggregation level(s)) of the SCI 2].

Content included in the square bracket is optional, and the SCI 1 may or may not include the content.

During specific implementation, the frequency domain resource of the second control information may be indicated by using one or more subchannel identifiers, candidate locations (candidates), or a set (set) of resource blocks (resource block, RB) on which the SCI 2 is located.

SCI 2: The SCI 2 includes any one or more of data transmission information, channel state information (channel state information, CSI), power control, and/or indication information of a physical sidelink feedback channel (Physical sidelink feedback channel (PSFCH)).

The following is an example of related fields of the SCI 2:

modulation and coding scheme ((Modulation and coding scheme)—x bits)
new data indicator (New data indicator)—x bit;
redundancy version: (Redundancy version)—x bits;
hybrid automatic repeat request enable/disable (HARQ enable/disable)—x bit;
hybrid automatic repeat request process number (HARQ process number)—x bits;
physical downlink shared channel to hybrid automatic repeat request feedback time indicator (PDSCH-to-HARQ_feedback timing indicator)—x bits;
hybrid automatic repeat request resource indicator (HARQ resource indication)—x bits;
CSI enable/disable/which kind of feedback (CSI enable/disable/which kind of feedback)—x bit;
CSI resource indication (CSI resource indication)—x bits;
transmit power control command (transmission power control, TPC command)—x bits; and
repetition number ((Repetition number)—x bits).

The data transmission information includes any one or more of the modulation and coding scheme, the new data indicator, the redundancy version, or the repetition number. x bits in the foregoing different fields are merely an indication. It does not mean that x in each item needs to be the same, that is, x in each item may be different.

Based on the foregoing descriptions, an example in which the first control information is SCI 1 and the second control information is SCI 2 is still used, and the second solution may be represented as follows:

The following is an example of related fields of the SCI 1:

PPPP (or a 5QI, or QoS-related indication information),
resources occupied in time/frequency domain,
an identifier of at least one terminal device, [resource information, an aggregation level (aggregation level(s)) of the SCI 2],
[modulation and coding scheme, new data indication, redundancy version, repetition number].

Content included in the square bracket is optional, and the SCI 1 may or may not include the content.

The following is an example of related fields of the SCI 2:

SCI 2:
hybrid automatic repeat request enable/disable (HARQ enable/disable)—x bit;
hybrid automatic repeat request process number (HARQ process number)—x bits;
physical downlink shared channel to hybrid automatic repeat request feedback time indicator (PDSCH-to-HARQ_feedback timing indicator)—x bits;
hybrid automatic repeat request resource indicator (HARQ resource indication)—x bits;
CSI enable/disable/which kind of feedback (CSI enable/disable/which kind of feedback)—x bit;
CSI resource indication (CSI resource indication)—x bits;
transmit power control command (transmission power control, TPC command)—x bits; and
[-repetition number (Repetition number)—x bits].

It has been described above that there may be a plurality of forms of the location relationship between the resource for the first control information and the resource for the second control information. These different location relationships may be indicated by using corresponding indexes (Association index). For example, a location relationship between an SS 1 and an SS 2 may be indicated by using an index A, a location relationship between a CCE 1 and a CCE 2 may be indicated by using an index B, a location relationship between a first time domain location and a second time domain location may be indicated by using an index C, and a location relationship between a CORSET 1 and a CORSET 2 may be indicated by using an index D. Certainly, only an example is used herein for description, and the indexing method may alternatively be another expression method and is not limited to these methods. For example, a location relationship between a CCE_ID in which the SCI 1 is located and a CCE_ID in which the SCI 2 is located may also be represented as CCE_sci2⇔F(CCE_sci1). The location relationship may be a one-to-one relationship or a one-to-many relationship. In addition, the location relationship is not limited to the several types listed herein, and any location relationship is applicable provided that the location relationship can represent location relationship between two objects.

Figure 4:
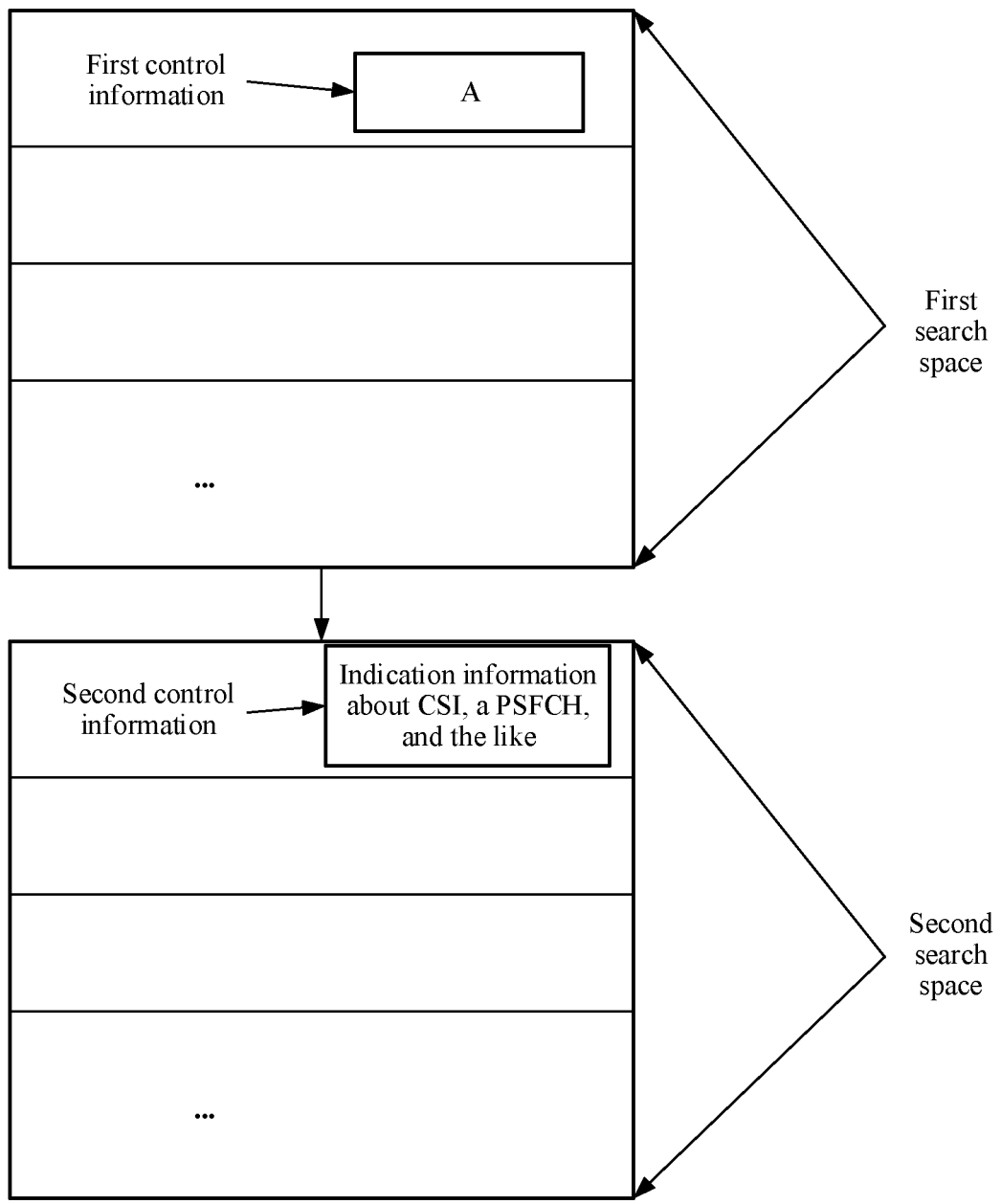
FIG. 4 is a schematic diagram of an association relationship in a search space according to an embodiment of this disclosure.

As to the location relationship, the location relationship between the SS 1 and the SS 2 is used as an example. Refer to FIG. 4 for understanding. As shown in FIG. 4, the SCI 1 is in a search space 1 (Search space 1, SS 1), and the SCI 2 is in a search space 2 (Search space 2, SS 2). An index A of the location relationship between the SS 1 and the SS 2 is marked in the SCI 1, so that after the index A is detected, the SCI 2 can be received from in the SS 2.

Actually, in this embodiment of this disclosure, the location relationship may alternatively be a combination of two or more location relationships, for another example, a location relationship between a CCE_ID in the SS 1 (SS1_Cx) in which the SCI 1 is located and a CCE_ID in the SS 2 (SS2_Cx) in which the SCI 2 is located, that is, SS2_Cx=551_Cx mod M+offset.

Figure 5:
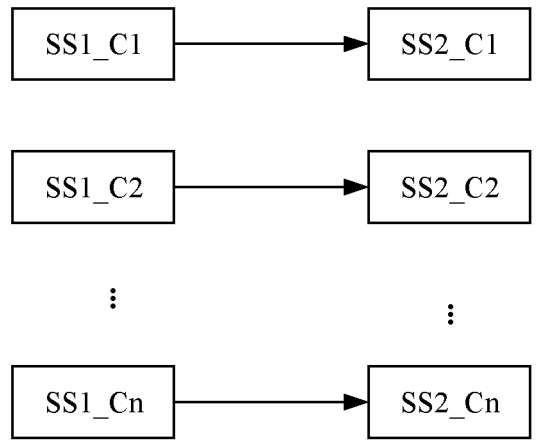
FIG. 5 is a schematic diagram of a combination association relationship between a search space and a CCE according to an embodiment of this disclosure.

For the location relationship between combinations of SSs and CCEs in this example, refer to FIG. 5 for understanding.

As shown in FIG. 5, SS1_C1 corresponds to SS2_C1, SS1Ω corresponds to SS2_C2, and SS1_Cn corresponds to SS2_Cn.

It has been described above that the content described in the solutions of this disclosure is about a specific resource from which a specific terminal apparatus or specific terminal apparatuses can receive the second control information. The information may be explicitly or implicitly indicated, or a part of the information is explicitly indicated and a part of the information is implicitly indicated.

The specific terminal apparatuses that can receive the second control information may be indicated in a form of identifiers of the terminal apparatuses. The following uses an example in which the identifier of the group is used as the first identification information to describe the specific terminal apparatuses that can receive the second control information. That is, the identifier of the group below may be replaced with any identifier included in the first identification information.

The specific resource from which the terminal apparatus can receive the second control information may be indicated in a form of a resource or a location relationship, where the resource is determined by using the identifier of the group. In addition, an indication method includes an explicit indication method and an implicit indication method. Therefore, there are a plurality of combination relationships in this embodiment of this disclosure. The combination relationships may be listed as follows:

1. Explicitly indicate the identifier of the group, and explicitly indicate the resource.
2. Explicitly indicate the identifier of the group, and explicitly indicate the location relationship.
3. Implicitly indicate the identifier of the group, and explicitly indicate the resource.
4. Implicitly indicate the identifier of the group, and explicitly indicate the location relationship.
5. Explicitly indicate the identifier of the group, and implicitly indicate the resource.
6. Explicitly indicate the identifier of the group, and implicitly indicate the location relationship.
7. Implicitly indicate the identifier of the group, and implicitly indicate the resource.
8. Implicitly indicate the identifier of the group, and implicitly indicate the location relationship.

Certainly, the foregoing eight combinations are merely examples, and there may be more combination forms. In addition, forms of the resource and the location relationship are also diversified. The following separately describes the eight combination relationships by using only the eight combination relationships as an example.

1. Explicitly indicate the identifier of the group, and explicitly indicate the resource.

This combination relationship may be that the identifier of the group is directly provided in the first control information, for example, Group1 (G1), and the resource for the second control information is directly provided, for example, a time domain 3 (Time3). In this case, it indicates that a terminal apparatus in a groupcast service group 1 may receive the second control information at a location of the time domain 3.

Certainly, explicitly indicating the identifier of the group and explicitly indicating the resource are not limited to this method of providing the identifier of the group and the resource in the first control information. Alternatively, the group identifier may be provided in control information, and then the resource for the second control information is explicitly indicated by using other signaling, for example, RRC signaling. Alternatively, both the identifier of the group and the resource are indicated by using other signaling.

2. Explicitly indicate the identifier of the group, and explicitly indicate the location relationship.

This combination relationship may be that the identifier of the group is directly provided in the first control information, for example, G1, and the location relationship between the resource for the first control information and the resource for the second control information is directly provided, for example, SS2_C1=SS 1_C1 mod M+offset. It indicates that the terminal apparatus in the groupcast service group 1 may receive the second control information in the CCE 1 of the SS 2.

Certainly, explicitly indicating the identifier of the group and explicitly indicating the location relationship are not limited to this method of providing the identifier of the group and the location relationship in the first control information. Alternatively, the identifier of the group may be provided in control information, and then the location relationship is explicitly indicated by using other signaling, for example, RRC signaling. Alternatively, both the identifier of the group and the location relationship are indicated by using other signaling.

3. Implicitly indicate the identifier of the group, and explicitly indicate the resource.

This combination relationship may be that the identifier of the group is not provided in the first control information, but an association between a groupcast service group and a resource has been preconfigured. For example, the time domain 3 (Time3) can be used only by the groupcast service group G1. In this case, when an indication for the time domain 3 appears in the first control information, it also indicates that a terminal apparatus in G1 may receive the second control information at the location of the time domain 3.

Certainly, explicitly indicating the resource is not limited to this method of providing the resource in the first control information, and the resource for the second control information may also be explicitly indicated by using other signaling, for example, RRC signaling.

4. Implicitly indicate the identifier of the group, and explicitly indicate the location relationship.

This combination relationship may be that the identifier of the group is not provided in the first control information, but an association between a groupcast service group and a resource has been preconfigured. For example, an association between G1 and G3 and SS1_C1 and SS2_C1 is preconfigured. In this case, when the first control information includes a location relationship between SS1S1 and SS2S1, it indicates that terminal apparatuses in G1 and G3 may receive the second control information in SS2_C1.

Figure 6:
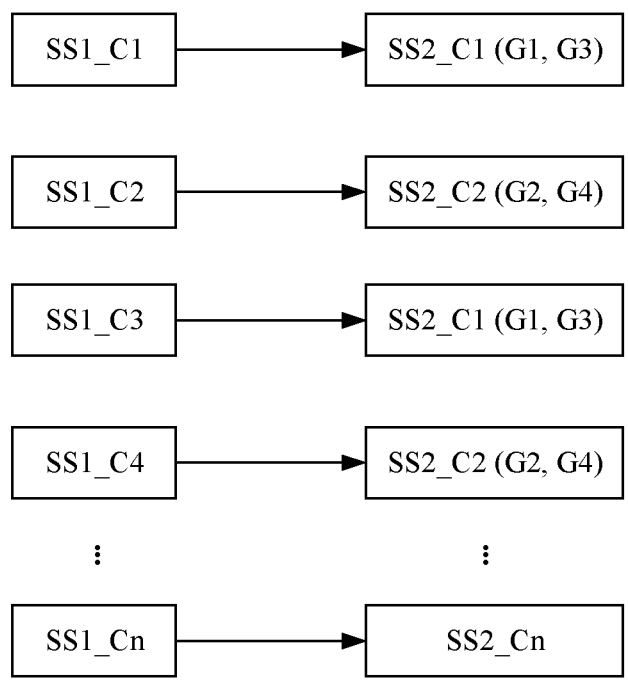
FIG. 6 is a schematic diagram of another combination association relationship between a search space and a CCE according to an embodiment of this disclosure.

As shown in FIG. 6, the identifier of the group is used as an example, and the location relationship may be that SS1S1 corresponds to SS2_C1 (G1, G3). (G1, G3) indicates that after a terminal apparatus belonging to a group whose identifier is G1 or G3 receives the first control information in SS1_C1, the terminal apparatus may receive the second control information in SS2_C1. Similarly, SS1Ω corresponds to SS2_C2 (G2, G4). (G2, G4) indicates that after a terminal apparatus belonging to a group whose identifier is G2 or G4 receives the first control information in SS1_C2, the terminal apparatus may receive the second control information in SS2_C2. SS1_C3 corresponds to SS2_C3 (G1, G3). (G1, G3) indicates that after a terminal apparatus belonging to a group whose identifier is G1 or G3 receives the first control information in SS1S3, the terminal apparatus may receive the second control information in SS2_C3. SS1_C4 corresponds to SS2_C4 (G2, G4). (G2, G4) indicates that after a terminal apparatus belonging to a group whose identifier is G2 or G4 receives the first control information in SS1_C4, the terminal apparatus may receive the second control information in SS2_C4. SS1_Cn corresponds to SS2_Cn (G(n−2), Gn). (G(n−2), Gn) indicates that after a terminal apparatus belonging to a group whose identifier is G(n−2) or Gn receives the first control information in SS1_Cn, the terminal apparatus may receive the second control information in SS2_Cn.

In the embodiment corresponding to FIG. 6, in the SCI 1, the identifier of the group may be implicitly indicated through preconfiguration, and actually, the identifier of the group may be indicated by using a function.

For example, a corresponding function is [G_ID, CCE_ID]⇔F(CCE). There may be one or a plurality of G_IDs, and the plurality of G_IDs may be used as results of mod M, for example, G_x mod 10. Therefore, there may be a plurality of corresponding groups. For example, groups 1, 11, 21 are used as a corresponding first column of groups, and groups 2, 12, and 22 are used as a corresponding second column of groups.

In another embodiment, a corresponding function includes SS2_Cx=SS1_Cx mod M+offset, and a correspondence involving G_x.

The foregoing solution may be understood as follows: G1, G11, and G21 receive the first control information in the CCE 1 of the SS 1, and may receive the second control information in the CCE 1 of the SS 2. G2, G12, and G22 receive the first control information in the CCE 2 of the SS 1, and may receive the second control information in the CCE 2 of the SS 2, and so on.

Figure 7:
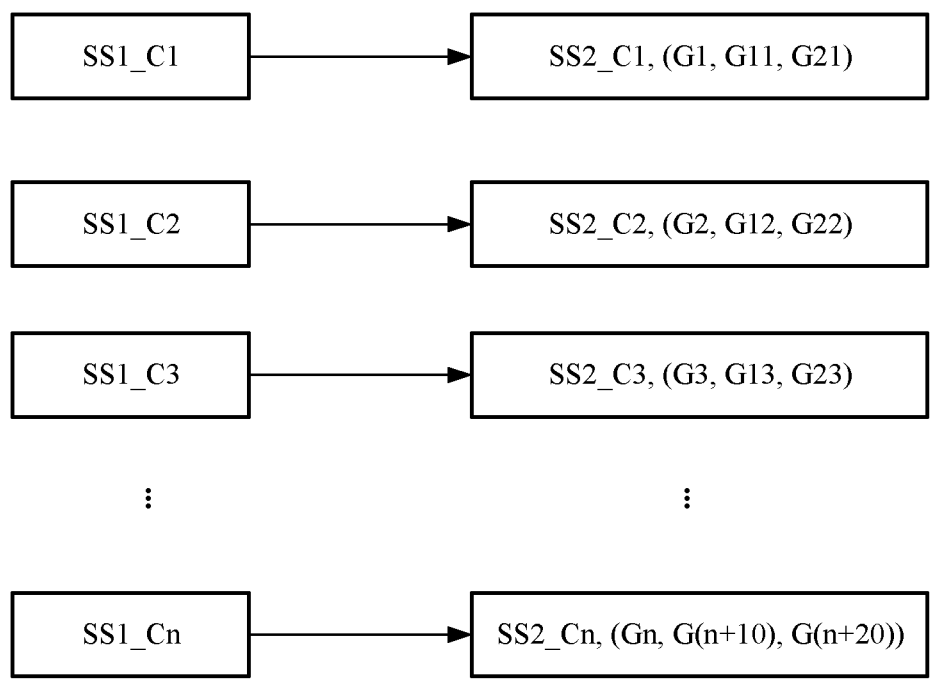
FIG. 7 is a schematic diagram of another combination association relationship between a search space and a CCE according to an embodiment of this disclosure.

As shown in FIG. 7, SS1S1 corresponds to SS2S1, and G1, G11, and G21. It indicates that after terminal apparatuses belonging to groups whose identifiers are G1, G11, and G21 receive the first control information in SS1_C1, the terminal apparatuses may receive the second control information in SS2_C1. SS1_C2 corresponds to SS2_C2, and G2, G12, and G22. It indicates that after terminal apparatuses belonging to groups whose identifiers are G2, G12, and G22 receives the first control information in SS1Ω, the terminal apparatuses may receive the second control information in SS2_C2. SS1_C3 corresponds to SS2S1, and G3, G13, and G23. It indicates that after terminal apparatuses belonging to groups whose identifiers are G3, G13, and G23 receive the first control information in SS1_C3, the terminal apparatuses may receive the second control information in SS2_C3. SS1_Cn corresponds to SS2_Cn, and Gn, G(n+10) and G(n+20). It indicates that after terminal apparatuses belonging to groups whose identifiers are Gn, G(n+10), and G(n+20) receive the first control information in SS1_Cn, the terminal apparatuses may receive the second control information in SS2_Cn.

Certainly, this scenario is merely an example. Each correspondence between SS1_Cx and SS2_Cx and a group is not limited to involving the foregoing three groups, and may be determined based on data of a groupcast service group in an actual scenario.

5. Explicitly indicate the identifier of the group, and implicitly indicate the resource.

The combination relationship may be that the identifier of the group is directly provided in the first control information, for example, Group1 (G1), and the resource may be implicitly indicated by using a preconfigured correspondence between a group and a resource. For example, a resource corresponding to G1 is the time domain 3. In this case, it indicates that a terminal apparatus in the groupcast service group 1 may receive the second control information at the location of the time domain 3.

6. Explicitly indicate the identifier of the group, and implicitly indicate the location relationship.

This combination relationship may be that the identifier of the group is directly provided in the first control information, for example, Group1 (G1). The location relationship may be indicated by using a preconfigured correspondence between a group and a location relationship. For example, a location relationship corresponding to G1 is SS2_C1=SS 1_C1 mod M+offset. It indicates that a terminal apparatus in the groupcast service group 1 may receive the second control information in the CCE 1 of the SS 2.

7. Implicitly indicate the identifier of the group, and implicitly indicate the resource.

In the combination relationship, the resource is implicitly indicated by using the location relationship. This solution is equivalent to the solution of implicitly indicating the identifier of the group and explicitly indicating the location relationship in the point 4. Refer to the foregoing point 4 for understanding.

Alternatively, the identifier of the group may be indirectly determined by using a device identifier of the first terminal apparatus, and then a correspondence between the identifier of the group and a preconfigured resource is determined.

8. Implicitly indicate the identifier of the group, and implicitly indicate the location relationship.

This combination relationship may be that the identifier of the group is indirectly determined based on a device identifier of the first terminal apparatus, and then the identifier of the group and the preconfigured location relationship are determined.

Figure 8:
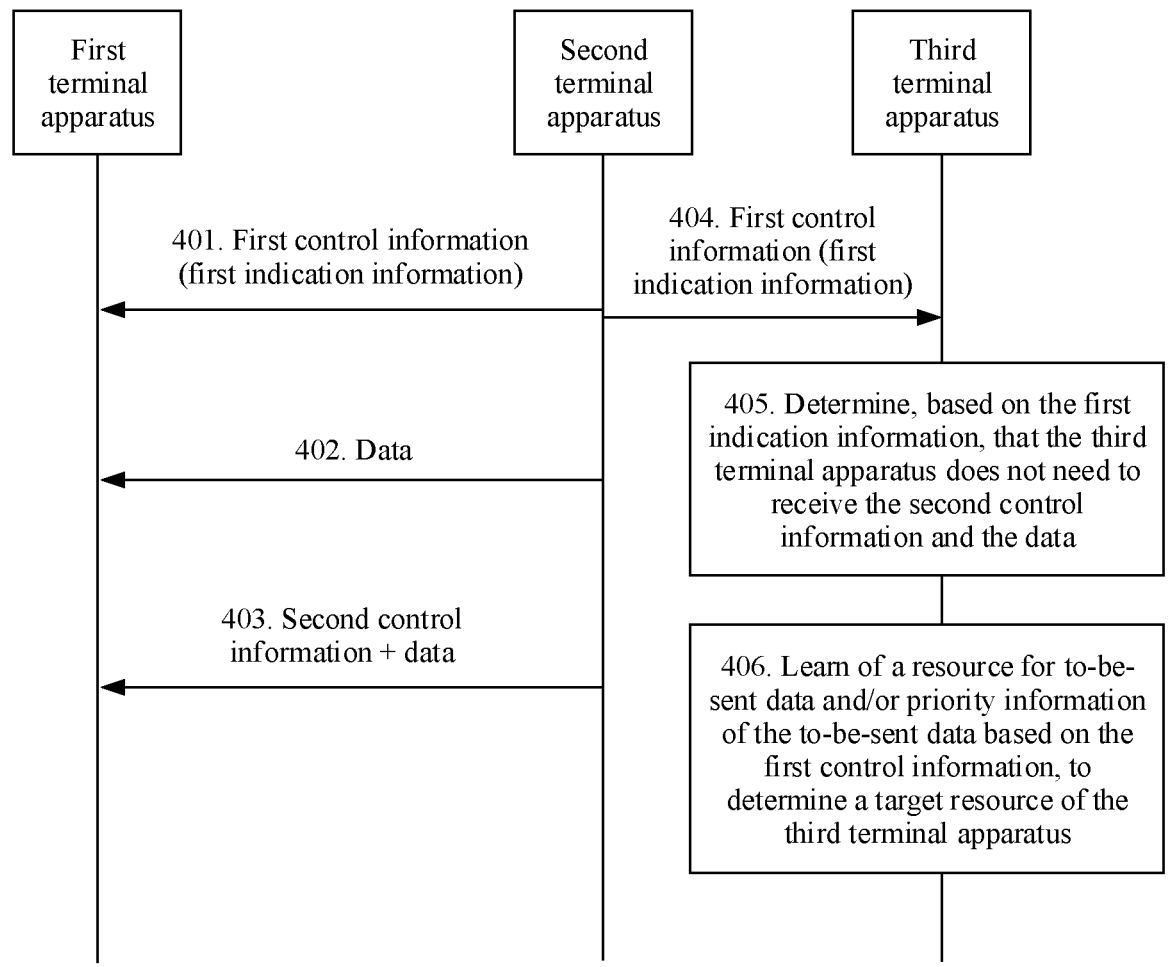
FIG. 8 is a schematic diagram of another embodiment of a data receiving and sending method according to an embodiment of this disclosure.

As shown in FIG. 8, an embodiment of this disclosure further provides a data receiving and sending method, and the method may include the following steps.

401. A first terminal apparatus receives first control information from a second terminal apparatus, and correspondingly, the second terminal apparatus sends the first control information.

Optionally, before step 401, the method may further include: The second terminal apparatus determines at least one terminal apparatus that needs to receive to-be-sent data.

The first control information is used to indicate a resource for the to-be-sent data of the second terminal apparatus and/or a priority of the to-be-sent data, the first control information includes first indication information, and the first indication information is used to indicate at least one of transport format information of the to-be-sent data and related information for receiving second control information.

In some embodiments, the first indication information includes one or a combination of the following:
  indication information about whether to receive the second control information;
  information about an aggregation level of a resource for transmitting the second control information;
  first identification information;
  resource information of the second control information, where the resource information of the second control information indicates a resource for transmitting the second control information; or
  a modulation and coding scheme MCS of the to-be-sent data, a new data indicator NDI, a redundancy version, or a repetition number.

In an optional design, the transport format information of the to-be-sent data may include at least one of the following information:
  a modulation and coding scheme MCS of the to-be-sent data, a new data indicator NDI, a redundancy version, or a repetition number.

In an optional design, the related information for receiving the second control information may include at least one of the following information: indication information about whether to receive the second control information;
  information about an aggregation level of a resource for transmitting the second control information;
  first identification information; or
  resource information of the second control information, where the resource information of the second control information indicates a resource for transmitting the second control information.

402. The first terminal apparatus receives the to-be-sent data based on the first control information, and correspondingly, the second terminal apparatus sends the to-be-sent data.

403. The first terminal apparatus receives the second control information from the second terminal apparatus, and receives the to-be-sent data based on the first control information and the second control information; and correspondingly, the second terminal apparatus sends the second control information and the to-be-sent data.

The second control information includes at least one of indication information about channel state information and indication information of feedback information for the to-be-sent data.

The second control information may further include the transport format information.

In some embodiments, before the first terminal apparatus receives the second control information from the second terminal apparatus, the method may further include: The first terminal apparatus determines, based on the first indication information, how to detect the second control information.

In some embodiments, that the first terminal apparatus determines, based on the first indication information, how to detect the second control information may include:
  When the first indication information includes only the indication information about whether to receive the second control information, the first terminal apparatus blindly detects the second control information;
    when the first indication information includes only the first identification information, the first terminal apparatus determines, based on the first identification information, whether to detect the second control information; or
    when the first indication information includes information about the resource for transmitting the second control information, the first terminal apparatus detects the second control information based on the information about the resource for transmitting the second control information.

According to both the data receiving method described from the perspective of the first terminal apparatus and the data sending method described from the perspective of the second terminal apparatus, the first control information and the second control information for the same to-be-sent data may be separately received and sent. In this way, the first terminal apparatus that needs to receive the to-be-sent data can quickly receive the second control information based on the first control information, and further receive the to-be-sent data, thereby improving data receiving efficiency.

In addition, in this embodiment of this disclosure, for the third terminal apparatus not belonging to the at least one terminal apparatus, the third terminal apparatus may receive only the first control information, and does not need to further receive the second control information, so that the third terminal apparatus can also save detection resources for the second control information.

Still referring to FIG. 8, the following describes, by using steps 405 and 406 in FIG. 8, operations performed by the third terminal apparatus after the second terminal apparatus sends the first control information.

404. The third terminal apparatus receives the first control information from the second terminal apparatus, and correspondingly, the second terminal apparatus sends the first control information.

405. The third terminal apparatus determines, based on the first indication information, that the third terminal apparatus does not need to receive the second control information and the data.

406. The third terminal apparatus learns of the resource for the to-be-sent data and/or priority information of the to-be-sent data based on the first control information, to determine a target resource of the third terminal apparatus.

Optionally, the third terminal apparatus may select a different resource as the target resource of the third terminal apparatus without using the resource that is for the to-be-sent data and that is indicated by the first control information.

Optionally, the third terminal apparatus may determine, based on priority information of the third terminal apparatus and the priority information indicated by the first control information, whether the resource that is for the to-be-sent data and that is indicated by the first control information can be occupied. When the resource can be occupied, the target resource determined by the third terminal apparatus may partially overlap the resource that is for the to-be-sent data and that is indicated by the first control information, or completely overlap the resource that is for the to-be-sent data and that is indicated by the first control information. When the resource cannot be occupied, the third terminal apparatus selects a different resource as the target resource of the third terminal apparatus.

Content described in the embodiment corresponding to FIG. 8 and names in the content may be understood with reference to the corresponding content in the parts of FIG. 1 to FIG. 7. Moreover, descriptions of names in the parts of FIG. 1 to FIG. 7 and narrower and more detailed content are all applicable to the solution described in FIG. 8. Details are not described herein again.

It should be noted that, for brief description, the foregoing method embodiments are expressed as combinations of a series of actions. However, persons skilled in the art should know that the present invention is not limited to the described action sequence, because according to the present invention, some steps may be performed in another sequence or performed simultaneously. In addition, persons skilled in the art should also know that all the embodiments described in the specification are preferred embodiments, and the related actions and modules are not necessarily mandatory to the present invention.

The data receiving method is described in the foregoing embodiments. The following describes related terminal apparatuses in the embodiments of this disclosure with reference to the accompanying drawings.

Figure 9:
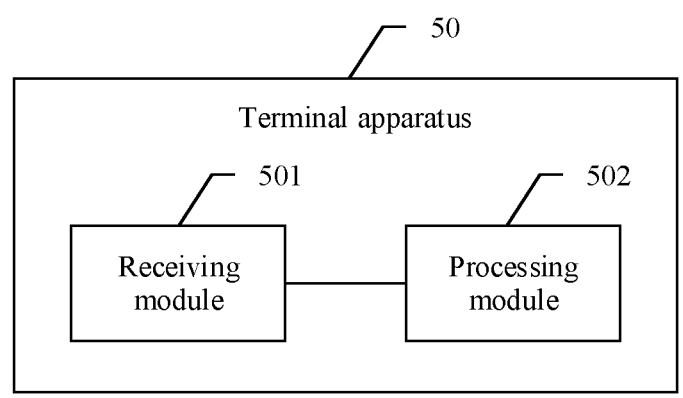
FIG. 9 is a schematic diagram of an embodiment of a terminal apparatus according to an embodiment of this disclosure.

As shown in FIG. 9, an embodiment of this disclosure provides a terminal apparatus. The terminal apparatus 50 includes:
- a receiving module 501, configured to receive first control information from a second terminal apparatus, where the first control information is used to indicate a resource for to-be-sent data of the second terminal apparatus and/or a priority of the to-be-sent data, the first control information includes first identification information, and the first identification information is used to indicate at least one terminal apparatus that needs to receive the to-be-sent data; and
- a processing module 502, configured to determine, based on the first identification information in the first control information received by the receiving module 501, that the first terminal apparatus belongs to the at least one terminal apparatus.

The receiving module 501 is further configured to receive second control information from the second terminal apparatus, where the second control information includes at least one of transport format information of the to-be-sent data, indication information about channel state information, and indication information of feedback information for the to-be-sent data.

The receiving module 501 is further configured to receive the to-be-sent data based on the first control information and the second control information.

In some embodiments of this disclosure, a format of the first control information is different from a format of the second control information.

In some embodiments of this disclosure, the first identification information is one of the following identifiers:
- an identifier of each terminal apparatus in the at least one terminal apparatus;
- an identifier of a pair formed by each terminal apparatus in the at least one terminal apparatus and the second terminal apparatus;
- an identifier of a group to which the at least one terminal apparatus belongs;
- a radio network temporary identifier RNTI of each terminal apparatus in the at least one terminal apparatus;
- an RNTI of a pair formed by each terminal apparatus in the at least one terminal apparatus and the second terminal apparatus; or
- an RNTI of a group to which the at least one terminal apparatus belongs.

In some embodiments of this disclosure, the receiving module 501 is configured to: when the first control information further includes resource information of the second control information, and the resource information of the second control information indicates a resource for transmitting the second control information, receive the second control information from the resource for transmitting the second control information.

In some embodiments of this disclosure, the processing module 502 is further configured to: when the first control information further includes resource information of the second control information, and the resource information of the second control information indicates a location relationship between a resource for transmitting the second control information and a resource for transmitting the first control information, determine, based on the location relationship and the resource for transmitting the first control information, the resource for transmitting the second control information.

The receiving module 501 is configured to receive the second control information from the resource for transmitting the second control information.

In some embodiments of this disclosure, the processing module 502 is configured to:
- when the first control information is located in a first control channel element CCE, determine, based on the first CCE and the location relationship, that the second control information is located in a second CCE;
- when the first control information is located in a first time domain unit, determine, based on the first time domain unit and the location relationship, that the second control information is located in a second time domain unit; or
- when the first control information is located in a first control resource set CORSET, determine, based on the first CORSET and the location relationship, that the second control information is located in a second CORSET.

In some embodiments of this disclosure, the resource for transmitting the second control information includes at least one of the following:
- a time domain resource for transmitting the second control information;
- a frequency domain resource for transmitting the second control information; or
- a spatial domain resource for transmitting the second control information.

In some embodiments of this disclosure, the location relationship between the resource for transmitting the second control information and the resource for transmitting the first control information may include:
- an offset of a time domain resource for transmitting the second control information relative to a time domain resource for transmitting the first control information;
- an offset of a frequency domain resource for transmitting the second control information relative to a frequency domain resource for transmitting the first control information; or an offset of a spatial domain resource for transmitting the second control information relative to a spatial domain resource for transmitting the first control information.

In some embodiments of this disclosure, the first control information may further include at least one of the following information: a modulation and coding scheme MCS of the to-be-sent data, a new data indicator NDI, a redundancy version, a repetition number, or an aggregation level of the resource for transmitting the second control information.

In some embodiments of this disclosure, the transport format information of the to-be-sent data may include at least one of the following information: a modulation and coding scheme MCS of the to-be-sent data, a new data indicator NDI, a redundancy version, a repetition number, or an aggregation level of the resource for transmitting the second control information.

In some embodiments of this disclosure, the indication information about the channel state information is used to indicate at least one of the following information:
  whether the at least one terminal apparatus needs to feed back the channel state information; or
  a type of the channel state information that needs to be fed back by the at least one terminal apparatus; and/or
  the indication information of the feedback information for the to-be-sent data is used to indicate at least one of the following information:
  whether the at least one terminal apparatus needs to send the feedback information for the to-be-sent data; or
  a resource used by the at least one terminal apparatus to send the feedback information for the to-be-sent data.

In some embodiments of this disclosure, the first control information is located in a first search space, the second control information is located in a second search space, and the first search space is different from the second search space.

In some embodiments, still referring to FIG. 9, an embodiment of this disclosure provides a terminal apparatus. The terminal apparatus 50 includes:
  a receiving module 501, configured to receive first control information from a second terminal apparatus, where the first control information is used to indicate a resource for to-be-sent data of the second terminal apparatus and/or a priority of the to-be-sent data, the first control information includes first indication information, and the first indication information is used to indicate at least one of transport format information of the to-be-sent data and related information for receiving the second control information.

The receiving module 501 is further configured to receive the to-be-sent data based on the first control information; or the receiving module 501 is further configured to: receive the second control information from the second terminal apparatus, and receive the to-be-sent data based on the first control information and the second control information, where the second control information includes at least one of indication information about channel state information and indication information of feedback information for the to-be-sent data.

The second control information may further include the transport format information.

In some embodiments, the first indication information includes one or a combination of the following:
  indication information about whether to receive the second control information;
  information about an aggregation level of a resource for transmitting the second control information;
  first identification information;
  resource information of the second control information, where the resource information of the second control information indicates a resource for transmitting the second control information; or
  a modulation and coding scheme MCS of the to-be-sent data, a new data indicator NDI, a redundancy version, or a repetition number.

In an optional design, the transport format information of the to-be-sent data may include at least one of the following information:
  a modulation and coding scheme MCS of the to-be-sent data, a new data indicator NDI, a redundancy version, or a repetition number.

In an optional design, the related information for receiving the second control information may include at least one of the following information: indication information about whether to receive the second control information;
  information about an aggregation level of a resource for transmitting the second control information;
  first identification information; or
  resource information of the second control information, where the resource information of the second control information indicates a resource for transmitting the second control information.

In some embodiments, the processing module 502 is configured to determine, based on the first indication information, how to detect the second control information.

In some embodiments, the processing module 502 is configured to:
  when the first indication information includes only the indication information about whether to receive the second control information, blindly detect the second control information;
  when the first indication information includes only the first identification information, determine, based on the first identification information, whether to detect the second control information; or
  when the first indication information includes information about the resource for transmitting the second control information, detect the second control information based on the information about the resource for transmitting the second control information.

Figure 10:
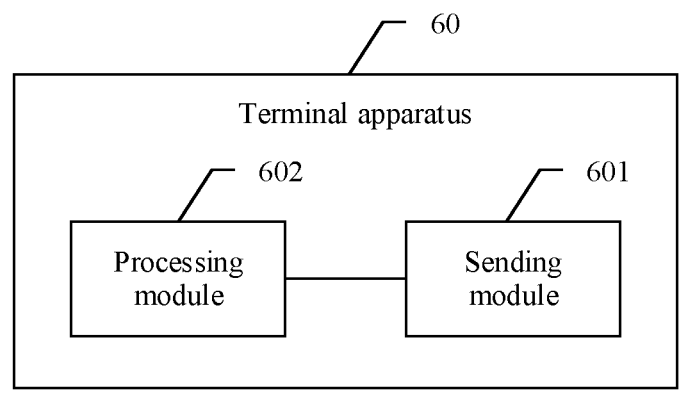
FIG. 10 is a schematic diagram of another embodiment of a terminal apparatus according to an embodiment of this disclosure.

As shown in FIG. 10, an embodiment of this disclosure provides a terminal apparatus. The terminal apparatus 60 includes:
  a sending module 601, configured to send first control information, where the first control information is used to indicate a resource for to-be-sent data and/or a priority of the to-be-sent data, the first control information includes first identification information, and the first indication information is used to indicate at least one of transport format information and indication information for receiving second control information.

The sending module 601 is further configured to send the second control information, where the second control information includes at least one of indication information about channel state information and indication information of feedback information for the to-be-sent data.

The sending module 601 is further configured to send the to-be-sent data.

The second control information may further include the transport format information.

Optionally, the terminal apparatus 60 may further include a processing module 602, configured to determine at least one terminal apparatus that needs to receive the to-be-sent data.

In some embodiments of this disclosure, a format of the first control information is different from a format of the second control information.

In some embodiments of this disclosure, the first identification information is one of the following identifiers:
- an identifier of each terminal apparatus in the at least one terminal apparatus;
- an identifier of a pair formed by each terminal apparatus in the at least one terminal apparatus and the second terminal apparatus;
- an identifier of a group to which the at least one terminal apparatus belongs;
- a radio network temporary identifier RNTI of each terminal apparatus in the at least one terminal apparatus;
- an RNTI of a pair formed by each terminal apparatus in the at least one terminal apparatus and the second terminal apparatus; or
- an RNTI of a group to which the at least one terminal apparatus belongs.

In some embodiments of this disclosure, the first control information may further include resource information of the second control information, where the resource information of the second control information indicates a resource for transmitting the second control information.

The resource for transmitting the second control information is used by a first terminal apparatus to receive the second control information.

In some embodiments of this disclosure, the first control information further includes resource information of the second control information, and the resource information of the second control information indicates a location relationship between a resource for transmitting the second control information and a resource for transmitting the first control information.

The location relationship is used by the first terminal apparatus to: determine the resource for transmitting the second control information, and then receive the second control information from the resource for transmitting the second control information.

In some embodiments of this disclosure, the resource for transmitting the second control information includes at least one of the following:
- a time domain resource for transmitting the second control information;
- a frequency domain resource for transmitting the second control information; or
- a spatial domain resource for transmitting the second control information.

In some embodiments of this disclosure, the location relationship between the resource for transmitting the second control information and the resource for transmitting the first control information may include:
- an offset of a time domain resource for transmitting the second control information relative to a time domain resource for transmitting the first control information;
- an offset of a frequency domain resource for transmitting the second control information relative to a frequency domain resource for transmitting the first control information; or
- an offset of a spatial domain resource for transmitting the second control information relative to a spatial domain resource for transmitting the first control information.

In some embodiments of this disclosure, the first control information may further include at least one of the following information: a modulation and coding scheme MCS of the to-be-transmitted data, a new data indicator NDI, a redundancy version, a repetition number, or an aggregation level of the resource for transmitting the second control information.

In some embodiments of this disclosure, the transport format information of the to-be-transmitted data may include at least one of the following information: a modulation and coding scheme MCS of the to-be-sent data, a new data indicator NDI, a redundancy version, or a repetition number.

In some embodiments of this disclosure, the indication information about the channel state information is used to indicate at least one of the following information:
- whether the at least one terminal apparatus needs to feed back the channel state information; or
- a type of the channel state information that needs to be fed back by the at least one terminal apparatus; and/or
- the indication information of the feedback information for the to-be-sent data is used to indicate at least one of the following information:
- whether the at least one terminal apparatus needs to send the feedback information for the to-be-sent data; or
- a resource used by the at least one terminal apparatus to send the feedback information for the to-be-sent data.

In some embodiments of this disclosure, the first control information is located in a first search space, the second control information is located in a second search space, and the first search space is different from the second search space.

In some embodiments, still referring to FIG. 10, an embodiment of this disclosure provides a terminal apparatus. The terminal apparatus 60 includes:
- a sending module 601, configured to send first control information, where the first control information is used to indicate a resource for to-be-sent data and/or a priority of the to-be-sent data, the first control information includes first indication information, and the first indication information is used to indicate indication information for receiving second control information.

The sending module 601 is further configured to send the to-be-sent data; or the sending module 601 is further configured to send the second control information and the to-be-sent data, where the second control information includes at least one of indication information about channel state information and indication information of feedback information for the to-be-sent data.

In some embodiments, the first indication information includes one or a combination of the following:
- indication information about whether to receive the second control information;
- information about an aggregation level of a resource for transmitting the second control information;
- first identification information;
- resource information of the second control information, where the resource information of the second control information indicates a resource for transmitting the second control information; or
- a modulation and coding scheme MCS of the to-be-sent data, a new data indicator NDI, a redundancy version, or a repetition number.

It should be noted that content such as information exchange between the modules of the terminal apparatus and the execution processes thereof is based on the same idea as the method embodiments of this disclosure, and produces the same technical effects as the method embodiments of the present invention. For specific content, refer to the foregoing descriptions in the method embodiments of this disclosure. Details are not described herein again.

An embodiment of this disclosure further provides a computer storage medium. The computer storage medium stores a program. The program executes some or all of the steps described in the foregoing method embodiments.

Figure 11:
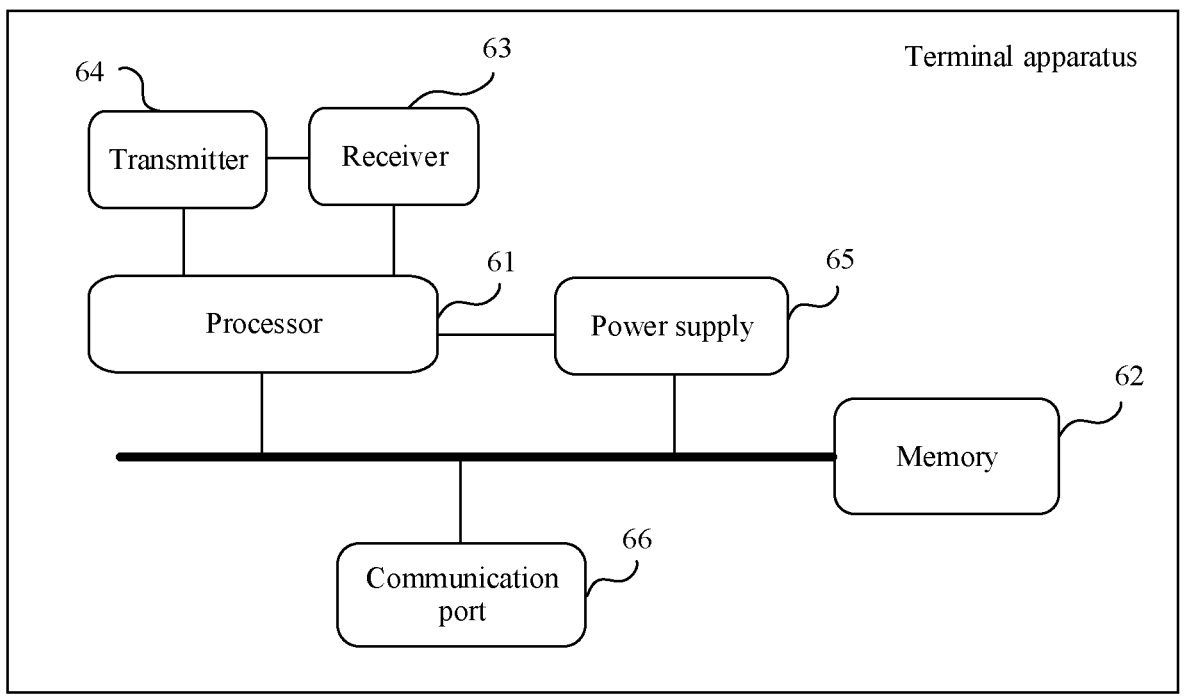
FIG. 11 is a schematic diagram of another embodiment of a terminal apparatus according to an embodiment of this disclosure.

FIG. 11 is a schematic structural diagram of another device according to an embodiment of this disclosure. The device is a terminal apparatus, and the terminal apparatus may include a processor 61 (for example, a CPU), a memory 62, a transmitter 64, and a receiver 63. The transmitter 64 and the receiver 63 are coupled to the processor 61, and the processor 61 controls a sending action of the transmitter 64 and a receiving action of the receiver 63. The memory 62 may include a high-speed RAM memory, or may further include a non-volatile memory NVM, for example, at least one magnetic disk memory. The memory 62 may store various instructions, to implement various processing functions and implement method steps of the embodiments of this disclosure. Optionally, the terminal apparatus in this embodiment of this disclosure may further include one or more of a power supply 65 and a communication port 66. The components described in FIG. 11 may be connected by using a communication bus, or may be connected in another connection way. This is not limited in this embodiment of this disclosure. The receiver 63 and the transmitter 64 may be integrated into a transceiver of the terminal apparatus, or may be receive antennas and transmit antennas that are independent of each other on the terminal apparatus. The communication bus is configured to implement communication connection between components. The communication port 66 is configured to implement connection and communication between the terminal apparatus and another peripheral.

In some embodiments, the processor 61 in the terminal apparatus may perform an action performed by the processing module 502 in FIG. 9, and the receiver 63 in the terminal apparatus may perform an action performed by the receiving module 501 in FIG. 9. Their implementation principles and technical effects are similar. Details are not described herein again.

In some embodiments, the processor 61 in the terminal apparatus may perform an action performed by the processing module 602 in FIG. 10, and the transmitter 64 in the terminal apparatus may perform an action performed by the sending module 601 in FIG. 10. Their implementation principles and technical effects are similar. Details are not described herein again.

In some embodiments, the memory 62 is configured to store computer-executable program code, and the program code includes instructions. When the processor 61 executes the instructions, the instructions enable the processor 61 to perform an action performed by the processing module in the terminal apparatus in the foregoing embodiments, and enable the transmitter 64 to perform an action of the sending module in the terminal apparatus in the foregoing embodiments. Their implementation principles and technical effects are similar. Details are not described herein again.

This application further provides a chip system. The chip system includes a processor, configured to support the foregoing terminal apparatus in implementing a function related to the terminal apparatus, for example, receiving or processing data and/or information in the foregoing method embodiments. In a possible design, the chip system further includes a memory, and the memory is configured to store program instructions and data that are necessary for the terminal apparatus. The chip system may include a chip, or may include a chip and another discrete device.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on a computer, the procedures or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) form. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

It may be clearly understood by persons skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other forms. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual coupling or direct coupling or communication connection may be implemented through some interfaces. The indirect coupling or communication connection between the apparatuses or units may be implemented in an electrical form, a mechanical form, or another form.

The units described as separate components may or may not be physically separate, and components displayed as units may or may not be physical units. To be specific, the components may be located at one position, or may be distributed on a plurality of network units. Some or all of the units may be selected based on actual requirements to achieve the objectives of the solutions of the embodiments.

In addition, function units in the embodiments of this disclosure may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods in the embodiments of this disclosure. The foregoing storage medium includes any medium that can store program code, for example, a USB flash drive, a removable hard disk, a read-only memory (Read-Only Memory, ROM), a random access memory (Random Access Memory, RAM), a magnetic disk, or an optical disc.

The foregoing embodiments are merely intended to describe the technical solutions of this disclosure, but not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this disclosure.

What is claimed is:

1. A data receiving method for sidelink communications, comprising:
   receiving, by a first terminal apparatus, first sidelink control information from a second terminal apparatus that indicates a resource for to-be-sent data of the second terminal apparatus and/or a priority of the to-be-sent data, the first sidelink control information comprises first indication information that indicates at least one of transport format information of the to-be-sent data and related information for receiving second control information;
   receiving, by the first terminal apparatus, the second sidelink control information from the second terminal apparatus, wherein the second sidelink control information comprises at least one of indication information about channel state information and indication information of feedback information for the to-be-sent data; and
   receiving, by the first terminal apparatus, the to-be-sent data based on the first sidelink control information and the second sidelink control information.

2. The method according to claim 1, wherein the first sidelink control information further comprises indication information of a reference signal mode.

3. The method according to claim 1, wherein the transport format information of the to-be-sent data comprises a modulation and coding scheme MCS of the to-be-sent data.

4. The method according to claim 1, wherein the related information for receiving the second sidelink control information comprises at least one of the following:
   indication information about whether to receive the second control information;
   information about an aggregation level of a resource for transmitting the second sidelink control information; or
   resource information of the second sidelink control information, wherein the resource information of the second control information indicates a resource for transmitting the second sidelink control information.

5. The method according to claim 1, wherein the indication information about the channel state information is used to indicate at least one of the following information:
   whether the first terminal apparatus needs to feed back the channel state information;
   a type of the channel state information that needs to be fed back by the first terminal apparatus.

6. The method according to claim 5 wherein the indication information of the feedback information for the to-be-sent data is used to indicate at least one of the following information:
   whether the first terminal apparatus needs to send the feedback information for the to-be-sent data; or
   a resource used by the first terminal apparatus to send the feedback information for the to-be-sent data.

7. A data sending method for sidelink communications, comprising:
   sending, by a second terminal apparatus, first sidelink control information to a first terminal apparatus, wherein the first sidelink control information is used to indicate a resource for to-be-sent data and/or a priority of the to-be-sent data, the first sidelink control information comprises first indication information, and the first indication information is used to indicate at least one of transport format information and indication information for receiving second sidelink control information; and
   sending, by the second terminal apparatus, the second sidelink control information and the to-be-sent data, wherein the second sidelink control information comprises at least one of indication information about channel state information and indication information of feedback information for the to-be-sent data.

8. The method according to claim 7, wherein
   the first sidelink control information further comprises indication information of a reference signal mode.

9. The method according to claim 7, wherein
   the transport format information of the to-be-sent data comprises a modulation and coding scheme MCS of the to-be-sent data.

10. The method according to claim 7, wherein
    the related information for receiving the second sidelink control information comprises at least one of the following:
    indication information about whether to receive the second sidelink control information;
    information about an aggregation level of a resource for transmitting the second sidelink control information; or
    resource information of the second sidelink control information, wherein the resource information of the second sidelink control information indicates a resource for transmitting the second control information.

11. The method according to claim 7, wherein
    the indication information about the channel state information is used to indicate at least one of the following information:
    whether the first terminal apparatus needs to feed back the channel state information; or
    a type of the channel state information that needs to be fed back by the first terminal apparatus; and/or
    the indication information of the feedback information for the to-be-sent data is used to indicate at least one of the following information:
    whether the first terminal apparatus needs to send the feedback information for the to-be-sent data; or
    a resource used by the first terminal apparatus to send the feedback information for the to-be-sent data.

12. A first terminal apparatus, comprising:
a memory storage comprising instructions; and
one or more processors in communication with the memory storage, wherein the execution of the instructions by the one or more processors causes the apparatus to engage in sidelink communications to:
receive first-sidelink control information from a second terminal apparatus, wherein the first control information is used to indicate a resource for to-be-sent data of the second terminal apparatus and/or a priority of the to-be-sent data, the first sidelink control information comprises first indication information, and the first indication information is used to indicate at least one of transport format information of the to-be-sent data and related information for receiving the second sidelink control information,
receive the second sidelink control information from the second terminal apparatus, wherein the second sidelink control information comprises at least one of indication information about channel state information and indication information of feedback information for the to-be-sent data; and
receive the to-be-sent data based on the first sidelink control information and the second sidelink control information.

13. The first terminal apparatus according to claim 12, wherein
the first sidelink control information further comprises indication information of a reference signal mode.

14. The first terminal apparatus according to claim 12, wherein
the transport format information of the to-be-sent data comprises a modulation and coding scheme MCS of the to-be-sent data.

15. The first terminal apparatus according to claim 12, wherein
the related information for receiving the second sidelink control information comprises at least one of the following:
indication information about whether to receive the second sidelink control information;
information about an aggregation level of a resource for transmitting the second sidelink control information; or
resource information of the second sidelink control information, wherein the resource information of the second sidelink control information indicates a resource for transmitting the second sidelink control information.

16. The first terminal apparatus according to claim 12, wherein
the indication information about the channel state information is used to indicate at least one of the following information:
whether the first terminal apparatus needs to feed back the channel state information; or
a type of the channel state information that needs to be fed back by the first terminal apparatus; and/or
the indication information of the feedback information for the to-be-sent data is used to indicate at least one of the following information:
whether the first terminal apparatus needs to send the feedback information for the to-be-sent data; or
a resource used by the first terminal apparatus to send the feedback information for the to-be-sent data.

17. A first terminal apparatus, comprising:
a memory storage comprising instructions; and
one or more processors in communication with the memory storage, wherein the execution of the instructions by the one or more processors causes the apparatus to engage in sidelink communications to:
send first sidelink control information from the first terminal apparatus to a second terminal apparatus, wherein the first sidelink control information is used to indicate a resource for the to-be-sent data and/or a priority of the to-be-sent data, the first control information comprises first indication information, and the first indication information is used to indicate at least one of transport format information and indication information for receiving second control information, wherein
send the second sidelink control information and the to-be-sent data, wherein the second sidelink control information comprises at least one of indication information about channel state information and indication information of feedback information for the to-be-sent data.

18. The first terminal apparatus according to claim 17, wherein
the first sidelink control information further comprises indication information of a reference signal mode.

19. The first terminal apparatus according to claim 17, wherein
the transport format information of the to-be-sent data comprises a modulation and coding scheme MCS of the to-be-sent data.

20. The first terminal apparatus according to claim 17, wherein
the related information for receiving the second sidelink control information comprises at least one of the following:
indication information about whether to receive the second sidelink control information;
information about an aggregation level of a resource for transmitting the second control information; or
resource information of the second control information, wherein the resource information of the second control information indicates a resource for transmitting the second sidelink control information.

21. The first terminal apparatus according to claim 17, wherein
the indication information about the channel state information is used to indicate at least one of the following information:
whether the first terminal apparatus needs to feed back the channel state information; or
a type of the channel state information that needs to be fed back by the first terminal apparatus; and/or
the indication information of the feedback information for the to-be-sent data is used to indicate at least one of the following information:
whether the first terminal apparatus needs to send the feedback information for the to-be-sent data; or
a resource used by the first terminal apparatus to send the feedback information for the to-be-sent data.

* * * * *